United States Patent
Zonouz et al.

(10) Patent No.: US 11,347,887 B2
(45) Date of Patent: May 31, 2022

(54) VALUE-BASED INFORMATION FLOW TRACKING IN SOFTWARE PACKAGES

(71) Applicants: Rutgers, The State University of New Jersey, New Brunswick, NJ (US); The Regents of the University of California, Los Angeles, CA (US)

(72) Inventors: Saman Aliari Zonouz, Jersey City, NJ (US); Gabriel Salles-Loustau, Highland Park, NJ (US); Mani Srivastava, Sherman Oaks, CA (US); Moustafa Alzantot, Los Angeles, CA (US)

(73) Assignees: RUTGERS, THE STATE UNIVERSITY OF NEW JERSEY, New Brunswick, NJ (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 57 days.

(21) Appl. No.: 16/650,369

(22) PCT Filed: Oct. 2, 2018

(86) PCT No.: PCT/US2018/053920
§ 371 (c)(1),
(2) Date: Mar. 24, 2020

(87) PCT Pub. No.: WO2019/070675
PCT Pub. Date: Apr. 11, 2019

(65) Prior Publication Data
US 2020/0293682 A1    Sep. 17, 2020

Related U.S. Application Data

(60) Provisional application No. 62/567,498, filed on Oct. 3, 2017.

(51) Int. Cl.
*G06F 21/62* (2013.01)
*G06F 21/52* (2013.01)
*G06F 21/55* (2013.01)

(52) U.S. Cl.
CPC .......... *G06F 21/6245* (2013.01); *G06F 21/52* (2013.01); *G06F 21/552* (2013.01); *G06F 2221/034* (2013.01)

(58) Field of Classification Search
CPC ...... G06F 21/552; G06F 21/52; G06F 21/556; G06F 21/6245; G06F 2221/034
See application file for complete search history.

(56) References Cited

U.S. PATENT DOCUMENTS 6,247,151 B1    6/2001    Poisner
6,944,715 B2    9/2005    Britton et al.
(Continued)

OTHER PUBLICATIONS

PCT International Search Report and Written Opinion for application No. PCT/US2018/053920 entitled "Value-Based Information Flow Tracking in Software Packages," dated Dec. 21, 2018, 14 pages.
(Continued)

*Primary Examiner* — Thaddeus J Plecha
(74) *Attorney, Agent, or Firm* — Hamilton, Brook, Smith & Reynolds, P.C.

(57) ABSTRACT

A computer-implemented method, computer system, and computer program product are directed to improving computer security of a device using value based information flow tracking. Embodiments automatically capture raw data values from a data source of the device and store in memory the captured raw data values in a collection of sensitive data. Embodiments determine whether computed values of functions of a data flow are included in the collection of sensitive data. Based upon the determining, embodiments prevent values of the collection of sensitive data from being trans-
(Continued)

mitted from a sink of the device. Embodiments may determine whether string representations of computed operand and return values of numerical or arithmetic operations of the functions of the data flow are included in the collection of sensitive data.

20 Claims, 8 Drawing Sheets

(56) References Cited

U.S. PATENT DOCUMENTS

| | | | |
|---|---|---|---|
| 7,360,118 B1 | 4/2008 | Fesler | |
| 8,127,360 B1 | 2/2012 | Wilhelm et al. | |
| 8,671,455 B1* | 3/2014 | Zhu | H04L 63/0227 |
| | | | 726/26 |
| 10,474,826 B2 | 11/2019 | Hoog et al. | |
| 2014/0303769 A1* | 10/2014 | Koyama | G05B 23/0264 |
| | | | 700/121 |
| 2015/0227746 A1* | 8/2015 | Chen | G06F 21/54 |
| | | | 726/25 |
| 2017/0192717 A1* | 7/2017 | Lee | G06F 3/0631 |
| 2018/0120132 A1* | 5/2018 | Tanutama | G01D 21/00 |
| 2019/0188402 A1* | 6/2019 | Wang | G06N 3/08 |
| 2021/0397744 A1* | 12/2021 | Pechersky | G06F 21/6245 |

OTHER PUBLICATIONS

Arzt et al., "FlowDroid: Precise Context, Flow, Field, Object-sensitive and Lifecycle-aware Taint Analysis for Android Apps," Interdisciplinary Centre for Security, Reliability and Trust University of Luxembourg, Jun. 9-11, 2014, Edinburgh, United Kingdom, 11 pages.

Baklashov, M. "An On-Line Memory State Validation Using Shadow Memory Cloning," IEEE 17th International On-LineTesting Symposium (2011).

Notification of Transmittal of the International Preliminary Report on Patentability for International Application No. PCT/US2018/053920, dated Apr. 16, 2020, " Value-Based Information Flow Tracking in Software Packages".

* cited by examiner

```
float f1 = 4.05 f;
float f2 = 5.04 f;
float f3 = f1 + f2;
float f4 = f2 - f3;
```

Listing (5) Sequence of floating point operation in a ANDROID app

302

```
1: void com . example . floattrack . NainActivity$1 .
   onClick (ANDROID . view . view) (dex_method_idx
   = 18789)
DEX CODE :
0x0000:  const    v0 , #+1082235290
0x0003:  const    v1 , #+1084311470
0x0006:  add - float v2 , v0 , v1
0x0008:  sub - float v3 , v1 , v2
```

Listing (6) Generated dex code extracted with oatdump

304

```
ed9f9ab5           vldr.f32  s18 , [pc , #724] ; 0
         x4081999a
ed98ab3            vldr.f32  s16 , [pc , #716] ; 0
         x4081999a147ae
+  b480             push    r7
+  b487             push    r0
+  f44f77bf         mov.w   r7 , #382
+  df00             swi 0
+  bc87             pop     r0
+  bc80             pop     r7
ee798a08           vadd . f32  s17 , s18 , s16
+  b480             push    r7
+  b487             push    r0
+  f44f77bf         mov.w   r7 , #382
+  df00             swi 0
+  bc87             pop     r0
+  bc80             pop     r7
ee789a68           vsub . f32  s19 , s16 , s17
```

Listing (7) Generated assembly code by METRON'S dex2oat

306

```
rl_src1 = LoadValue (rl_src1, kFPReg); rl_src
2 = LoadValue (rl_src2, kFPReg); rl_result =
EvalLoc (rl_dest, kFPReg, true);

+ NewLIR1 (kThumbPush, rs_r0 . GetReg ());
+ NewLIR1 (kThumbPush, rs_r7 . GetReg ());
+ LoadConstant (rs_r7 , 382);
+ NewLIR1 (kThumbSwi , 0);
+ NewLIR1 (kThumbPop, rs_r7 . GetReg ());
+ NewLIR1 (kThumbPop, rs_r0 . GetReg ());
+

NewLIR3 (op, rl_result.reg .GetReg (), rl_src1.reg
   .GetReg(), rl_src2 .reg .GetReg ());

StoreValue (rl_dest, rl_result);
```

Listing (8) dex2oat compiler numerical instruction instrumentation

VALUE-BASED INFORMATION FLOW TRACKING IN SOFTWARE PACKAGES

RELATED APPLICATION

This application is the U.S. National Stage of International Application No. PCT/US2018/053920, filed Oct. 2, 2018, which designates the U.S., published in English, and claims the benefit of U.S. Provisional Application No. 62/567,498, filed on Oct. 3, 2017. The entire teachings of the above applications are incorporated herein by reference.

GOVERNMENT SUPPORT

This invention was made with government support under D15PC00159 from Department of Homeland Security (DHS). The government has certain rights in the invention.

BACKGROUND

In general, tracking as well as data flow tracking includes various programming language analysis techniques. These techniques are employed in a variety of applications such as privacy protection/verification.

SUMMARY

Applicants provide embodiments that track (monitor or determine) raw data values (sensor readings) over time and use tracking results to characterize data flow of a device or system. Application areas include Internet of Things domains, medical devices, mobile devices, and wearables (with a processor).

Some embodiments are capable of privacy protection/verification. According to some embodiments, if computer application has to comply with a security policy that says "no accelerometer sensor data should be sent out of the phone to external network entities," then a flow-tracking engine may track propagation of the accelerometer data from its source (the accelerometer sensor) system-wide while the subject data is being accessed and processed by various applications in the phone. Once the data is about to leave the phone through the network socket, the proposed may detect the policy violation and block the data flow. Some embodiments, in comparison with the traditional taint-based data flow tracking, may provide a more lightweight, accurate and effective outcome.

Compared to traditional taint-based data flow analysis, some embodiments do not have to track at least some instructions and are not required to perform taint propagation. Instead, some embodiments may inspect the instructions that perform arithmetic operation on the data values.

Embodiments include a computer-implemented method (and computer system, and computer program product) directed to improving computer security (including but not limited to user data protection) of a device using value based information flow tracking. Accordingly, some embodiments may protect user data in one or more devices.

According to some embodiments, the computer-implemented method may automatically capture one or more raw data values from a data source of the device. According to some embodiments, the method may store (record) in cache memory the captured one or more raw data values in a collection of sensitive data. The method may evaluate a data flow and/or determine (or track) a data flow based on the stored sensitive data value(s). The method may determine (or track) whether one or more computed values (or resulting values) of one or more functions of a data flow are included in the collection of sensitive data. Based upon the determining, the method may prevent one or more values of the collection of sensitive data from being transmitted from a sink of the device. In some embodiments, the method may prevent one or more values of the collection of sensitive data from being transmitted from the sink of the device to external untrusted parties.

According to some embodiments, the computer-implemented method may determine whether one or more representations (including but not limited to digital, value, digital value, or string representations) of one or more computed operand and return values of one or more numerical or arithmetic operations of the one or more functions of the data flow are included in the collection of sensitive data.

Storing may be performed in response to one or more security policies. Determining may be performed while the data flow is being accessed and processed. The device may include a mobile device, an embedded controller, and/or a computer processing device (including but not limited to a desktop computer, laptop computer and/or custom computer). The cache memory may be configured as any of a ring buffer, a value table, and an array or the like. The data source may include a sensor. The one or more raw data values may be readings of the sensor. The sensor may be of a data type configured to generate sensitive data. The sink may include any of a network socket, a file, or a message.

According to some embodiments, the method may report a violation based upon the determining. In response to the reported violation, the method may further block the one or more values of the collection of sensitive data from being transmitted from the sink of the device.

Some embodiments include a system (computer system). The system may include at least one processor, and memory (including cache memory) with computer code instructions stored thereon. The memory may be operatively coupled to the at least one processor such that, when executed by the at least one processor, the computer code instructions cause the computer system to implement one or more of the following functions as described herein.

The computer system may include a data module configured to automatically capture one or more raw data values from a data source of a device. The data module may be further configured to store (record) the one or more raw data values in a collection of sensitive data. The computer system may evaluate a data flow and/or track a data flow based on the stored sensitive data value(s). A computing module may be operatively coupled to the data module. The computing module may be configured to determine whether one or more computed (resultant) values of the one or more functions of the data flow are included in the collection of sensitive data. The computing module may be further configured, based upon the determining, to prevent one or more values of the collection of sensitive data from being transmitted from a sink of the device.

The computing module may be further configured to determine whether one or more representations (including but not limited to digital, value, digital value, or string representations) of one or more computed operand and return values of one or more numerical or arithmetic operations of the one or more functions of the data flow are included in the collection of sensitive data. The data module may perform storing in response to one or more security policies. The computing module may perform determining while the data flow is being accessed and processed. The device may include a mobile device, an embedded controller, and/or a computer processing device (including but not limited to a desktop computer, laptop computer and/or custom computer). The cache memory may be configured as any of a ring buffer, a value table, and an array, or the like. The data source may include a sensor. The one or more raw data values may be readings of the sensor. The sensor may be of a data type configured to generate sensitive data. The sink may include any of a network socket, a file, or a message.

According to some embodiments, the computing module may be further configured to report a violation based upon the determining. In response to the reported violation, the computing module may further block the one or more values of the collection of sensitive data from being transmitted from the sink of the device.

According to some embodiments, the computer program product may include a non-transitory computer-readable storage medium having code instructions stored thereon. The storage medium may be operatively coupled to a processor such that, when executed by the processor, the computer code instructions cause the processor to perform one or more functions as described herein.

According to some embodiments, the computer program product may automatically capture one or more raw data values from a data source of the device. According to some embodiments, the computer program product may store (record) in cache memory the captured one or more raw data values in a collection of sensitive data. The computer program product may determine whether one or more computed values of one or more functions of a data flow are included in the collection of sensitive data. The computer program product may evaluate a data flow and/or determine a data flow based on the stored sensitive data value(s). Based upon the determining, the computer program product may prevent one or more values of the collection of sensitive data from being transmitted from a sink of the device. In some embodiments, the computer system may prevent one or more values of the collection of sensitive data from being transmitted from the sink of the device to external untrusted parties.

According to some embodiments, the computer program product may determine whether one or more representations (including but not limited to digital, value, digital value, or string representations) of one or more computed operand and return values of one or more numerical or arithmetic operations of the one or more functions of the data flow are included in the collection of sensitive data.

Storing may be performed in response to one or more security policies. Determining may be performed while the data flow is being accessed and processed. The device may include a mobile device, an embedded controller, and/or a computer processing device (including but not limited to a desktop computer, laptop computer and/or custom computer). The cache memory is configured as any of a ring buffer, a value table, and an array, or the like. The data source may include a sensor. The one or more raw data values may be readings of the sensor. The sensor may be of a data type configured to generate sensitive data. The sink may include any of a network socket, a file, or a message.

The storage and execution of the information flow values may be protected by a hardware mechanism that allows trusted parties to access this data and algorithm, therefore preventing data disclosure to a malicious third-party.

The detection and storage of sensitive values may be assisted by machine learning mechanisms ensuring that the most relevant data benefits from this protection mechanism and therefore reduces further the system requirement for this protection mechanisms. Additionally, the proposed technique may enable privacy-preserving and secure machine learning algorithms such as deep neural networks that are based on numerical values.

Applications of this protection mechanism may include, non-restrictively, mobile devices, wearable devices, and/or self-driving cars that may intensively rely on sensor data to provide context awareness.

Another use for this protection mechanism are medical applications that rely on sensors to infer medical diagnostics at runtime based on the real-time data feeds.

According to some embodiments, the computer program product may report a violation based upon the determining. In response to the reported violation, the computer program product may further block the one or more values of the collection of sensitive data from being transmitted from the sink of the device. In some embodiments, the computer program product may prevent one or more values of the collection of sensitive data from being transmitted from the sink of the device to external untrusted parties.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale; emphasis instead being placed upon illustrating embodiments.

FIG. 3 is an illustration of code instrumentation, according to some embodiments.

DETAILED DESCRIPTION

Figure 1A:
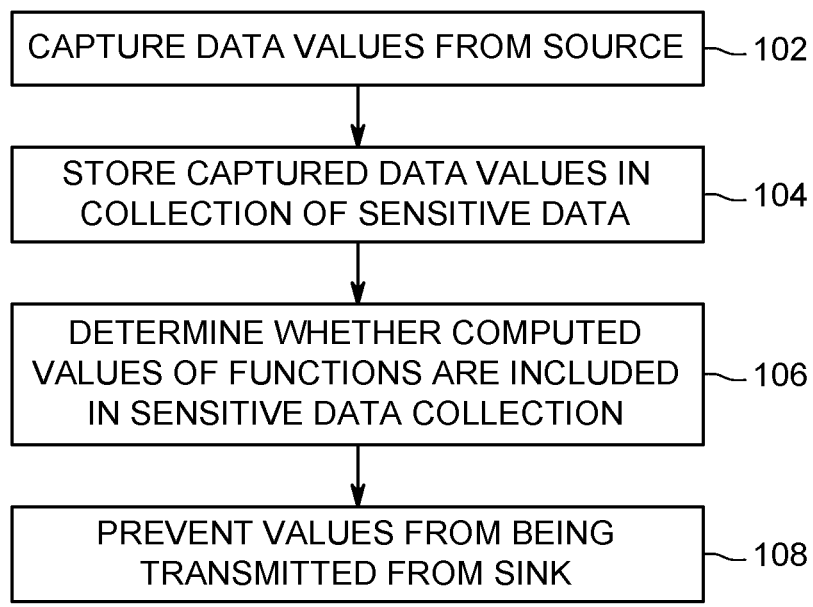
FIG. 1A is a flowchart of an example method (and system), according to some embodiments.

A description of example embodiments follows.

Mobile devices are equipped with a variety of sensors that enable various useful applications. While it is desirable to grant applications access to these sensors in order to accomplish their legitimate functionalities, ensuring that the sensor readings are not leaked to other parties is a challenging problem. Information flow tracking techniques have been proposed to detect malicious data flows. However, the existing solutions suffer from several usability and precision issues that hinder their adoption.

As such, embodiments of the present invention provide an information flow tracking framework to detect potential data disclosures. Embodiments leverage a new lightweight information flow tracking technique that enables flow detection based on tainted values rather than a shadow memory taint system. In particular, embodiments leverage an application sandbox mechanism to carry out the analysis of a monitored application. Unlike previous solutions, implementation on ANDROID may work as a user-space application that does not require modifying either the operating system or the target application. While legacy information flow tracking solutions may rely on the abandoned DALVIK VM, example embodiments are compatible with the latest ANDROID RUNTIME (ART). Embodiments are capable of providing a good accuracy for flow detection compared to other state-of-art solutions. Example embodiments report less false positives than TAINTDROID, as well as similar accuracy to BAYESDROID while handling numerical values that BAYESDROID cannot handle. Moreover, example embodiments allow the investigation of data leakage without modifying the operating system or the target application while adding acceptable overhead.

Section 1—Introduction

Modern mobile devices embed a wide range of sensors that enable novel usages and capabilities such as context awareness, activity recognition, and exercise tracking. Users have widely adopted usage of these mobile devices, as the mobile devices do not require purchasing extra hardware but simply installing an application (also known as "app" herein) that provide the new functionality. While these new sensors and applications empower the users by providing useful features, malicious attacks have also been developed by making use of these same sensors. For example, previous research has shown that sensors such as the accelerometer and gyroscope or ambient light sensors can be used as a keylogger mechanism (see Miluzzo, E., et al., "TapPrints: Your Finger Taps Have Fingerprints," In Proceedings of the 10th International Conference on Mobile Systems, Applications, and Services, ACM, pages 323-336, Jun. 25-29, 2012, which is incorporated by reference herein in its entirety and Spreitzer, R., "Pin Skimming: Exploiting the Ambient-Light Sensor in Mobile Devices," In Proceedings of the 4th ACM Workshop on Security and Privacy in Smartphones & Mobile Devices. ACM, pages 51-62, May 15, 2014, which is incorporated by reference herein in its entirety).

Mobile operating systems currently offer rudimentary protection mechanisms to defend users against malicious inferences attacks. The most popular mobile operating systems on the market, GOOGLE ANDROID and APPLE IOS, use runtime permissions mechanisms to regulate applications access to privacy-sensitive sensors, such as microphone or global positioning systems (GPS) having latitude, longitude, time, or other parameters. Other sensors such as the accelerometer do not require any permission at all. Permission mechanisms have been proven inefficient both in terms of relevance and efficiency: they provide coarse-grained permissions with no alternative but to comply with the permission request (see Felt, A. P., et al., "Android Permissions Demystified," In Proceedings of the 18th ACM Conference on Computer and Communications Security (CCS '11). ACM, New York, N.Y., USA, pages 627-638. https://doi.org/10.1145/2046707.2046779, Oct. 17-21, 2011, which is incorporated by reference herein in its entirety and Sarma, B., et al., "Android Permissions: A Perspective Combining Risks and Benefits," In Proceedings of the 17th ACM Symposium on Access Control Models and Technologies (SACMAT '12), ACM, New York, NY, USA, pages 13-22, Jun. 20-22, 2012, https://doi.org/10.1145/2295136.2295141, which is incorporated by reference herein in its entirety). As a result, it is nearly impossible for a user to grasp if any app computes a specific inference and if an app intentionally, or maliciously, leaks sensor values.

Information flow tracking (IFT) solutions have been proposed to identify applications that leak sensitive data, including but not limited to hardware sensor data and personal data. These solutions monitor data flows from a privacy-sensitive source, such as hardware sensor readings, and determine if a flow of sensitive data reaches a sink which can be network socket, a file, or a message shared with another app via inter-process communication (IPC). State of art approaches for information flow tracking analysis techniques can be categorized as follows: off-line static analysis, such as FLOWDROID (see Arzt, S., et al., "FLOWDROID: Precise, Context, Flow, Field, Object-sensitive and Lifecycle-aware Taint Analysis for Android Apps," Acm Sigplan Notices, 49, 6, pages 259-269, Jun. 9-11, 2014, which is incorporated by reference herein in its entirety) or DROIDSAFE (see Gordon, M. I., et al., "Information-Flow Analysis of Android Applications in DROIDSAFE. In NDSS '15, Citeseer, 16 pages, Feb. 8-11, 2015, which is incorporated by reference herein in its entirety) and runtime dynamic analysis, such as BAYES-DROID (see Tripp, O., et al., "A Bayesian Approach to Privacy Enforcement in Smartphones," In 23rd USENIX Security Symposium (USENIX Security 14, pages 175-190, Aug. 20-22, 2014, which is incorporated by reference herein in its entirety) or TAINTDROID (see W Enck, W., et al., "TaintDroid: an information-flow tracking system for realtime privacy monitoring on smartphones," In Proceedings of the 9th USENIX conference on Operating systems design and implementation. USENIX Association, pages 393-407, Oct. 4-6, 2010, which is incorporated by reference herein in its entirety), or DROID SCOPE (see an, L. K., et al., "DROIDSCOPE: Seamlessly Reconstructing the OS and Dalvik Semantic Views for Dynamic Android Malware Analysis," In USENIX Conference on Security Symposium, pages 29-29, Aug. 8-10, 2012, which is incorporated by reference herein in its entirety)). On the one hand, static analysis suffers from high processing cost and can be easily bypassed by dynamic code loading. On the other hand, dynamic IFT solutions differ by the granularity they provide: for example, HISTAR (see Zeldovich, N., et al., "Making Information Flow Explicit in HISTAR," In Proceedings of the 7th USENIX Symposium on Operating Systems Design and Implementation, Vol. 7, 16 pages, Nov. 6-8, 2006, which is incorporated by reference herein in its entirety) labels operate on high-level system objects such as processes and files while TAINTDROID implements a variable-level IFT. This granularity directly impacts the precision of the information flow detection. Moreover, dynamic analysis solutions tend to provide minimal information in their leak reports. A typical alert currently includes the tainted data with a corresponding source.

From a user perspective, dynamic IFT solutions provide "black-and-white" conclusions about whether a given app discloses sensitive data to unauthorized parties. The common flow provenance reporting adopted by IFT solutions fails to characterize a flow in several ways. Consider two different fitness sports apps, where one sends out accelerometer data readings constantly while in use, whereas the other app reports monthly running distance averages. A typical dynamic data flow tracker may mark both of them as privacy violations regardless, because the network outputs are tainted by the source sensor data. More importantly, a single value detected at a sink may not give information about the type of computation it results from. Currently, taint tracking solutions may not differentiate a raw data leakage (e.g., raw accelerometer data) from an inference computed value (e.g., a pedometer application can infer the number of steps walked by a person from the raw accelerometer data). A static analysis solution partially bridges this gap, but at a very high computing cost, both in terms of memory space and time. Such an extreme black-and-white treatment of sensitive data disclosures may lead to unnecessarily pessimistic conclusions about legitimate apps. Consequently, users may discard reporting alerts due to their inaccurate reports.

A second issue resides in the usability of current IFT solutions. Existing dynamic taint tracking solutions such as BAYES-DROID, TAINTDROID or DROIDSCOPE may require system modifications (i.e., modifying the operating system or requiring root access). Generally, dynamic information flow solutions require substantial system modifications and require the user to install a custom modified version of ANDROID and/or require root privileges. Such requirements have prevented the adoption of information flow tracking technologies by common users who are incapable or unwilling to replace their factory images of ANDROID by a custom one in order to check if an application is disclosing their personal data.

As a result, the investigation of privacy leakage by applications has been the work of a limited group of researchers which do not have the resources to cover the gigantic amount of applications available on the smartphone platforms. Also, currently available solutions such as TAINTDROID are implemented by modifying the DALVIK virtual machine. Unfortunately, these solutions may not be compatible with new versions of ANDROID since GOOGLE has shifted ANDROID application execution environment from the DALVIK virtual machine to the new ANDROID RUNTIME (ART) as of ANDROID 5.0. Recent work such as ARTIST (see Backes, M., et al., "ARTist: The Android Runtime Instrumentation and Security Toolkit," CoRR abs/1607.06619, http://arxiv.org/abs/1607.06619, 13 pages, Jul. 22, 2016, which is incorporated by reference herein in its entirety) proposes an ART based taint tracking but still requires system modification.

Some embodiments provide a new practical information flow tracking solution and a data disclosure analysis framework for numerical values such as sensors measurements. In order to address the fundamental issues that exist in current taint-taint based information flow tracking solutions, some embodiments focus on three or more aspects. First, some embodiments introduce a new value-based information flow tracking system. Second, the embodiments track tainted data operation history and adds this information to the sink reporting. Third, embodiments enable deployment on top of unmodified commodity versions of ANDROID without requiring root access. Hence some embodiments can be used by any user to check the privacy leakage of applications running on his or her phone.

While the majority of previous IFT solutions use taint metadata to identify data flows, some embodiments introduce a new approach for tracking sensitive data based on the sensitive data value(s). The embodiments provide an evaluation of this value-based IFT approach and show how it achieves comparable performance and precision to previous solutions while infringing less memory overhead and fewer deployment constraints. Embodiments may follow propagation logic: any operation that manipulates a value previously seen at the source or is a result of an operation that contains data from a source is an operation involved in a flow from this source and thus returns sensitive tainted data. Some embodiments operate by instrumenting numerical instructions in order to track operands values and record return value as a flow tracking mechanism. The embodiments store the result of past numerical operations that involve arguments that are part of these previously seen information flow. In addition to this flow detection mechanism, embodiments record each taint value operation history. This enables a characterization of data flows that beyond white and black assessment. To evaluate this approach, a prototype is implemented on top of ANDROID 5.0. The prototype may run as a third-party application that acts as a sandbox layer between the unmodified ANDROID system and the monitored application. Some embodiments may perform evaluation on unmodified ANDROID systems running real word applications installed directly from the PLAY-STORE. In addition, for some embodiments, design may be ported back to ANDROID 4.3 in order to compare its accuracy against the state of art legacy solutions such as TAINTDROID, and BAYESDROID. Compared to TAINTDROID, embodiments may improve the detection accuracy significantly, and reports fewer false positives (2 versus 17). And in comparison to BAYESDROID, some embodiments may also report better accuracy in terms of the number of true positives while being able to handle numerical values.

Some embodiments may include design and evaluation of a novel lightweight information flow analysis algorithm for numerical values that does not require exhaustive instruction instrumentation. Applicants implement a prototype and evaluate its performance and accuracy versus other solutions. This evaluation is conducted using benchmarks and real-world popular applications execution traces that manipulate sensors values. Applicants show how to extend current IFT solutions to provide insightful information about leaks that go beyond a black or white detection mechanism through the collection of tainted data operations history as an inference detection mechanism.

FIG. 1A is a flowchart of an example method (and system), according to embodiments of the present invention. As illustrated in FIG. 1A, the first step 102 of the computer-implemented method (and computer system, and computer program product) 1000 automatically captures one or more raw data values from a data source (i.e. sensors) of the device. The next step 104 stores in cache memory the captured one or more raw data values (sensor readings) in a collection of sensitive data. The next step 106 determines whether one or more computed values of one or more functions of a data flow are included in the collection of sensitive data. Based upon the determining, the next step 108 may prevent one or more values of the collection of sensitive data from being transmitted from a sink of the device, as so called "tainted" data.

According to some embodiments, the method (computer-implemented method) may determine whether one or more representations (including but not limited to digital, value, digital value, or string representations) of one or more computed operand and return values of one or more numerical or arithmetic operations of the one or more functions of the data flow are included in the collection of sensitive data.

Storing may be performed in response to one or more security policies. Tracking may be performed while the data flow is being accessed and processed. The device may include a mobile device, an embedded controller, and/or a computer processing device (including but not limited to a desktop computer, laptop computer and/or custom computer). The cache memory may be configured as any of a ring buffer, a value table, and an array. The data source may include a sensor. The one or more raw data values may be readings of the sensor. The sensor may be of a data type configured to generate sensitive data. The sink may include any of a network socket, a file, or a message.

According to some embodiments, the method (device, system) may report a violation based upon the tracking. In response to the reported violation, the method (device, system) may further block the one or more values of the collection of sensitive data from being transmitted from the sink of the device.

In other words, the method (and system) may look at raw sensor values, hold values inside a cache memory, and compare results in held in the cache memory with values of the data flow to determine whether a sensitive value has been tainted. As such, the method (and system) may prevent such tainted values from being transmitted from the system, after identifying the tainted values. Such identification may be performed based upon monitoring of the data flow and comparison with the cache memory before data is transmitted out from the system.

Section 2—Overview

TABLE 1

Number of floating point operations encountered at execution time in cfree pedometer app

| | |
|---|---|
| # DEX op executed | 25,080,000 |
| # fp op executed | 106,514 (0.42%) |
| # numerical op executed | 1,891,834 (7.5%) |

Figure 1B:
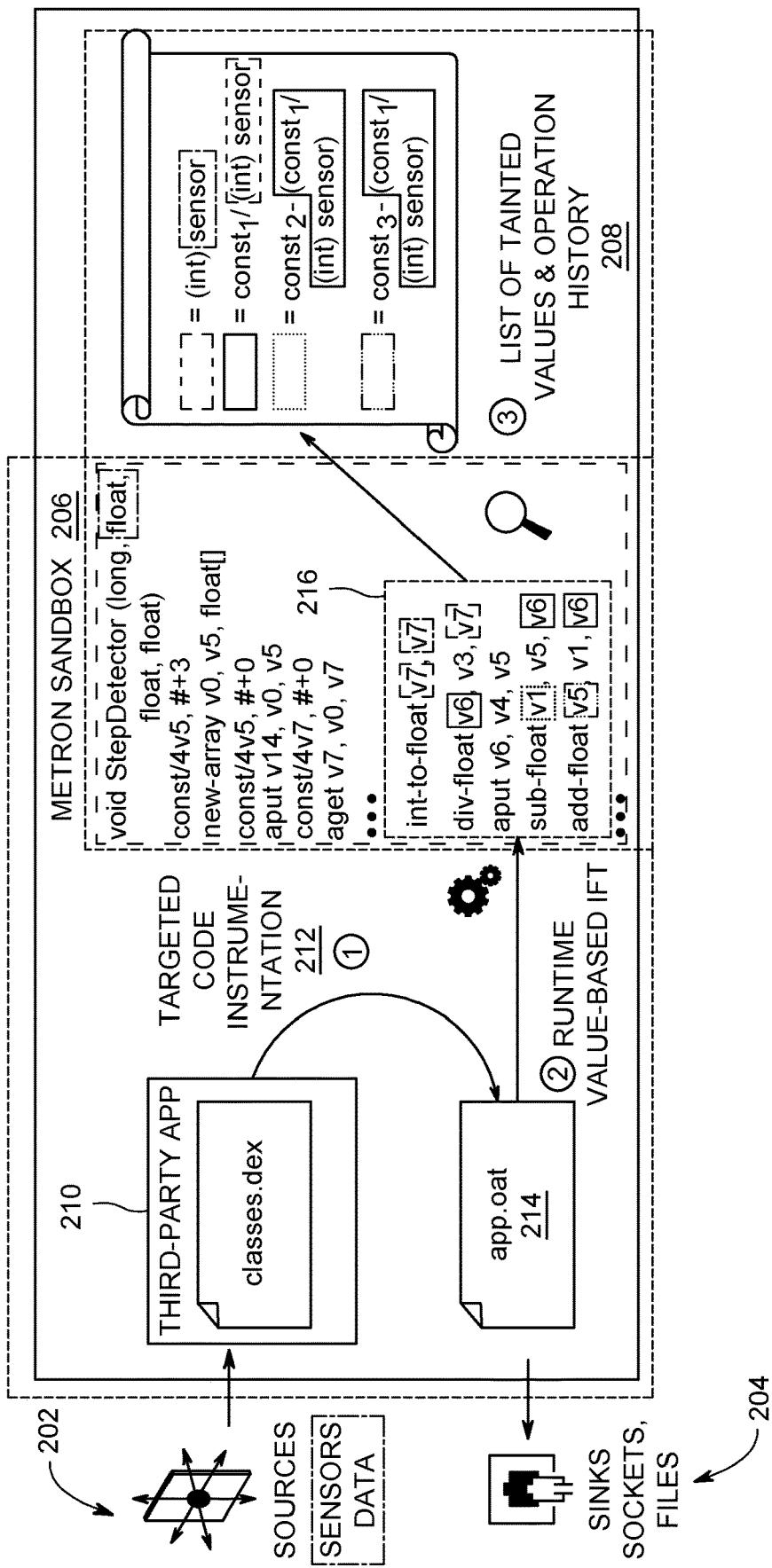
FIG. 1B presents a dynamic information flow tracking (DIFT) frame-work for handling numerical values, according to some embodiments.

As illustrated in FIG. 1B, some embodiments may include a dynamic information flow tracking (DIFT) frame-work for numerical values. In FIG. 1B, DIFT solutions track data flows from a set of sources 202 to a set of sinks 204. According to some embodiments, sources 202 can be any system component that generates numerical values, such as phone sensors. Contrary to existing techniques that use a taint metadata, stored in a shadow memory, to track information flows, some embodiments may instead record values involved in data flows. This approach leverages the operands and return values of numerical operations. Some embodiments may keep track of the result of numerical computations that involve tainted values which are either raw values from a source 202 or computed values that are functions of other previously tainted values. See Section 4.1 titled "Sources and Sinks" regarding how raw data is considered.

When data reaches a sink 204, some embodiments may detect the information flow involving tainted values by comparing representations (including but not limited to digital, value, digital value, or string representations) of numerical values against the set of previously encountered tainted values. The inspection of numerical operations operands and return values is achieved by running the application 210 within a virtualized environment (i.e. a sandbox, element 206) and by instrumenting 212 the application code (thereby providing an output .oat file, element 214 of FIG. 1B) using a modified version of the DEX2OAT compiler. The present invention may be implemented by other means within the virtualized environment 206 including but not limited to including using interrupts or using other mechanisms enabled on other operating systems or via virtual machines like those supported by VMWARE.

At runtime, most ANDROID applications have a small ratio of numerical instructions executed by comparison to the overall number of operations executed. Table 1 above shows statistics about the percentage of numerical and more specifically floating point operations in a popular pedometer application. Even applications that constantly compute inferences from the sensors data, such as pedometer applications, have a ratio of numerical instructions to the total number of instructions performed <10% (and <1% for floating point operations). This observation motivates the design of a selective monitoring of these numerical operations. Instead of instrumenting all operations to detect information flows, some embodiments may instrument a subset of instructions which include numerical instructions.

This selective instruction coverage implies a tradeoff between some embodiments' accuracy versus traditional approaches for taint-tracking (e.g., taint stored in shadow memory). Applicants investigate this tradeoff by analyzing the challenges in terms of flow coverage and correctness of the flows detected. Intuitively, limiting the scope of operations tracked to numerical operations constrains the scope of the detection of the system to values that are read as numerical values and that are manipulated as numerical values. According to some embodiments, evaluation may show that in practice this challenge does not heavily affect the solution flow detection rate by comparison to other solutions. Also, employing the values themselves as a propagation mechanism can lead to false positives: a same numerical value can result from two different sequences of operations, from two different data flows, one being tainted and the other one not being tainted. In practice most of the sensors provide high entropy of the values manipulated with very low chance of collision (same exact value found twice). Also, section 4 presents a design tradeoff for keeping track of tainted values having a direct influence on this challenge.

Additionally, as represented in FIG. 1B, some embodiments provide extra information to the user regarding the nature of the flow that reaches the sink. Some embodiments keep track of the computation history 208 of each tainted numerical value 216 and provide a basis for further analysis to compute risk analysis based on the history of operations 208 used to compute the leaked value 216. According to some embodiments, the risk assessment of a flow reaching a sink is left to the user. However, some embodiments are not so limited.

One may evaluate the performance overhead and usability of the method (and system) 1000 via its implementation as a sandboxing app. One may run and investigate data leakage from any other third party applications while not requiring any changes to the system or to the application. In practice, the user may install two apps to use this solution: Applicant's embodiment and the application to be investigated. The target application is started through Applicant's embodiment. The embodiment transparently uses dynamic code loading and app virtualization techniques, which is discussed to follow in section 5, to monitor the flow of sensitive values while the target app is running.

Section 3—Threat Model

According to some embodiments, the threat model may assume that apps have access to the device sensors and leverage this access to achieve one or more purposes. Some embodiments may consider privacy threats caused unintentionally by legitimate (as opposed to malicious) applications. Some embodiments assume that applications being examined do not try to leverage any known or unknown vulnerability in the underlying execution framework (kernel, system services). According to embodiments, while the implementation presented in embodiments follows this assumption, the design proposed may have a relaxed threat model that assumes that the hardware is trusted by leveraging trusted hardware commodities such as ARM TRUSTZONE to host the flow decision logic.

Some embodiments assume that no covert channel attack is used by applications. Some embodiments assume that no external actors try to defeat the analysis techniques presented by tampering with the sensor environment. Some embodiments assume that there is no intentional tampering with the phone environment to defeat the flow detection.

Section 4—Value-Based Information Flow Tracking

The following presents various design challenges that are solved by some embodiments of the value-based information flow tracking system.

4.1 Sources and Sinks

According to some embodiments, the information flow tracking solution may handle numerical values, but is not so limited. The information sources that some embodiments consider may include a numerical values generator, e.g. accelerometer, GPS, or heart-rate sensor. Moreover, sensors generating high entropy numerical values are considered. According to some embodiments, smartphone sensors that generate floating point values are a target of choice as data sources (see Android Developers. 2017. (2017). Android Motion Sensors; available at https://developer.android.com/guide/topics/sensors/sensors_motion.html, which is incorporated by reference herein in its entirety) enumerates the motion sensors supported by the ANDROID OS and their unit of measure. Most of these sensor readings are stored as floating point values in ANDROID. Moreover, sensors, such as the accelerometer, may allow developers to specify pooling data frequency. High sensor precision and customizable pooling frequency are key factors that enable some embodiments' value-based information flow tracking system. These two parameters determine how likely a sensor may generate a unique new value and thus may ensure that values that may be tracked are different. High entropy in these values eventually ensures the minimization of false positive detection for the information flow tracking system. Some embodiments assume that the likelihood of a collision (e.g. same value generated multiple times) is null.

Some embodiments use classic detection interfaces as information flow sinks. Possible sinks include network sockets, IPC messages, and files. At the sinks, some embodiments assume the data is encoded as cleartext ASCII bytes arrays. The flow detection at the sinks is performed by comparing any numerical value representation in the string (and/or digital, value, or digital value) to the list of tainted numerical maintained by some embodiments. The detection of a numerical value at the sink relies on a regular expression that matches any integer or floating point representation.

Listing 1 shows an example of a file written by a pedometer application that utilizes the accelerometer to compute the number of steps the user made. In this file writing operation, the string (and/or other digital representation or value) detected at the sink is marked as containing sensor data. All integer or floating point values do not carry sensitive information. Typically, the XML version number 1.0 is not a relevant value to lookup. So is the 8 of UTF-8. However, the remaining numerical values in this file are values derived from a computation of the accelerometer data and that are values of interest.

In the Listing 1 to follow, the flow detection is triggered by the value "0.010439022" that is computed as a function of the accelerometer measurements, according to some embodiments. According to some embodiments, such a detection result is similar to dynamic IFT solution: it provides information about the origin of the data, the source and the sink the data is detected at. It is interesting to note that other values are not detected by legacy solutions such as TAINTDROID.

Listing 1: Example of flow detected at the sink. App: Accupedo

```
<?xmlversion='1.0'encoding='utf-8'standalone='yes'?>
<map>
    <intname="lapsteps"value="25"/>
    <floatname="distance"value="0.010439022"/>
    <floatname="lapdistance"value="0.010439022"/>
    <long name="lapsteptime"value="11670"/>
    <long name="steptime"value="11670"/>
    <floatname="calories"value="0.85382223"/>
    <floatname="lapcalories"value="0.85382223"/>
    <intname="lapnumber"value="1"/>
    <intname="steps"value="25"/>
</map>
```

4.2 Information Flow Tracking via Numerical Values

According to some embodiments, the information flow tracking solution may rely on the operands and return value of numerical operations as a way to perform taint propagation during the application execution time.

Contrary to metadata-based information flow tracking solutions where system objects such as variables, process, files, as examples, may be tainted using shadow variables that indicate the belonging or the provenance of a flow, some embodiments may rely on the comparison between the numerical instruction operands values as a means to track a data flow. If one or more of the operands belongs to a list of tainted values maintained by some embodiments, then the return value of the instruction may be added to the list of tainted values. The list of tainted values may be bootstrapped by the raw values obtained from the source.

As illustrated in Table 1.2 below, an example embodiment is compared against existing metadata approaches. As shown in Table 1.2, Applicant's embodiment is capable of tracking (determining) based on a subset of instructions and corresponding values (indicated in bold in Table 1.2), whereas existing metadata approaches require tracking of memory manipulation operations in additional steps (illustrated in italics and not in bold in Table 1.2). As such, existing metadata approaches require additional storing and calculation as opposed to Applicant's example embodiment. In other words, Applicant's embodiment is a more lightweight or streamlined approach, providing more efficient, faster, and better computation (and technical improvement), as compared with existing metadata approaches.

TABLE 1.2

Value-Based Information Flow Tracking vs. Metadata approaches

| Applicant's embodiment (adds to value table) | App code | Execution | Update shadow memory |
|---|---|---|---|
| {1, 49} | x = read_sensor( ); // source | x = 1.49; | {x} |
|  | a = move_data_around(x); | a = 1.49; | {x, a} |
|  | b = move_data_around(x); | b = 1.49; | {x, a, b} |
| {1.49, 2.98} | y = b*2; // value change | y = 2.98; | {x, a, b, y} |
|  | c = move_data_around(b); | c = 1.49; | {x, a, b, y, c} |
|  | d = move_data_around(y); | d = 2.98; | {x, a, b, y, c, d} |
|  | z = y; | z = 2.98; | {x, a, b, y, c, d, z} |
| 2.98 in {1.49, 2.98} | send_data_socket(z); //sink | 2.98 -> OUT | z tainted? |

A first critical choice resides in determining the type of numerical operations some embodiments may track. There may be a tradeoff between the operation coverage that some embodiments may provide and the accuracy of the tracking mechanism. Some embodiments investigate two levels of coverage for numerical operations. The first level may cover floating point operations, i.e., float and/or double operations. The second level may extend coverage to integers and/or long operations. Such a choice may create a tradeoff between information flow detection and overhead. Section 6 investigates more the details regarding this tradeoff.

A second critical aspect comes from using values as a primitive to track flow. This problem can be broken down into three sub-problems: (1) the unicity of the values and the flow detection precision, (2) the storage of the values that belong to a flow, and (3) the flow lookup mechanism.

(1) Unicity of tainted values: The unicity (or uniqueness) of the tainted value may influence the precision of the IFT system of some embodiments. Two levels of precision may be distinguished: the ability to identify a tainted data flow from a non-tainted data flow, and the ability to identify correctly the flow history. Some embodiments may address the first problem by comparing the execution results to taint-based IFT systems, such as TAINTDROID. The second problem may fall out of the scope of existing taint tracking solutions and can be verified by recording the execution history. Taint tracking IFT solutions may provide a yes or no assessment about either a piece of data is tainted or not. However, unlike some embodiments, existing solutions may not provide further information about the history of a flow making the investigation of information flow quite hard.

The method (and system) of some embodiments may compare sensor readings to ensure that sensor values being read are unique. The method (and system) of some embodiments may monitor the results of one or more sensors and if a repeated value is detected within one sensor or among two or more sensors, then the method (and system) may flag an error indicating a possible collision.

For non-limiting example, in an example embodiment, the method (and system) may monitor a plurality of accelerometers. The accelerometer readings may form a gaussian distribution with respect to frequency over time. An example plot of such accelerometer readings (in meters/sec^2) may illustrate collisions being detected, for example, where an accelerometer reading is the reported to be the same among different accelerometers, but at a different frequency for the different accelerometers.

(2) Storage of tainted values: Smartphones are embedded devices. Especially when it comes to memory, operating system designers such as ANDROID make sure that the applications preferably do not use amounts of memory over a certain threshold. Mechanisms such as ANDROID's LOWMEMORYKILLER are designed to ensure this. The method (and system) of some embodiments addresses this issue by using a fixed memory space to store tainted values. This fixed space may be implemented as a ring buffer where the most recent tainted values are kept and the oldest ones are reused. The length of the ring buffer directly influences the precision of the information flow tracking system. Subsection 6.1 provides further detail regarding this choice. Some embodiments also store the history of the computation applied to a tainted value along with the value. This history may include a chain of characters that can be read as a function of sensor values.

(3) Value lookup: In order to determine if a value is part of a flow, some embodiments use a lookup mechanism in the ring buffer. According to some embodiments, the lookup may match values at the beginning of the buffer, which makes sense since a sequence of operations in the code may often reuse the least recently used computation results. Accordingly, some embodiments use a hybrid lookup mechanism that searches first the latest inserted values in the ring buffer and then uses a binary tree search if the value is not found. One important point to note, depending on the IFT precision that some embodiments want to achieve, some embodiments may perform one or multiple searches in the ring buffer. Some embodiments may taint sensitive data according to the IFT, and a search match on one or more of the parameters that are given to an operation may detect a flow. Some embodiments may lookup operands of the operation in order to build an operation history linked to the flow. The taint propagation may correspond to the search for a match between the values given as a parameter of an instruction and the values stored in the ring buffer. At the sink, however, some embodiments look for an approximate match between the value read at the sink and the values know in the ring buffer.

4.3 Operations History

For example, an accelerometer is one sensor of interest. Other sensors of interest include a gyroscope, global positioning system (GPS), or other sensors known to those skilled in the art. Some embodiments may make numerical sensor readings using one of these sensors, store the results in floating point variables, and process the results using numerical operations.

Some embodiments record the operation history for each tainted value, and may carry information about the sources and the type of operations performed by the shim layer. Listing 2 presents such an example of operation history. This function indicates exactly the specific operation that was computed on specific sensor values read at the source (e.g. S0_XXX). This specific computation provides further information about the data that is sent out. According to some embodiments, since it may be a very generic function definition, a function analysis can provide more detailed information about the content of the value. For example, this allows the differentiation between direct leaks from a sensor to a sink versus computed inferences.

---

Listing 2: Example of a flow history at the sink. App: Accupedo

```
(((((0.0909091*S0_114)+(0.909091*((0.0909091*S0_138
)+(0.909091*((0.0909091*S0_36)+(0.909091*((0.090909
1*S0_18)+(0.909091*((0.0909091*S0_120)
+(0.909091*((0.0909091*S0_114)+(0.909091*((0.090909
1*S0_12)+(0.909091*((0.0909091*S0_102)+(0.909091*(
(0.0909091*S0_0)+(0.909091*((0.0909091*S0_30)
+(0.909091*((0.0909091*S0_0)+(0.909091*((0.0909091*
S0_6)+(0.909091*((0.0909091*S0_36)+(0.909091*((0.09
09091*S0_0)+(0.909091*((0.0909091*S0_60)
+(0.909091*((0.0909091*S0_54)+(0.909091*((0.0909091
*S0_12)+(0.909091*((0.0909091*S0_0)+(0.909091*((0.0
909091*S0_36)+(0.909091*((0.0909091*S0_30)
+(0.909091*((0.0909091*S0_24)+(0.909091*((0.0909091
*S0_18)+(0.909091*((0.0909091*S0_12)+(0.909091*((0.
0909091*S0_6)+(0.909091*((0.0909091*S0_0)+−0.05792
58))))))))))))))))))))))))))))))))))))))))
)))
```

---

In an example embodiment, the operation history of Listing 2 may be associated with FIG. 1B. As illustrated in Listing 2, an example embodiment records the operation history for each tainted value, and may carry information about the sources 202 and the type of operations 216 performed by the shim layer. Listing 2 presents such an example of operation history 208.

In an example embodiment, this function (operation history) indicates the specific operation 216 that was computed on specific sensor values read at the source (e.g. S0_XXX) or element 202 of FIG. 1B. Such example sources 202 shown in bold in Listing 2 include "S 0_1 1 4," "S 0_1 3 8," and "S 0_3 6."

This specific computation provides further information about the data that is sent out. According to some embodiments, since it may be a very generic function definition, a function analysis can provide more detailed information about the content of the value. For example, this allows the differentiation between direct leaks from a sensor 202 to a sink 204 versus computed inferences.

Section 5—Implementation

Figure 2:
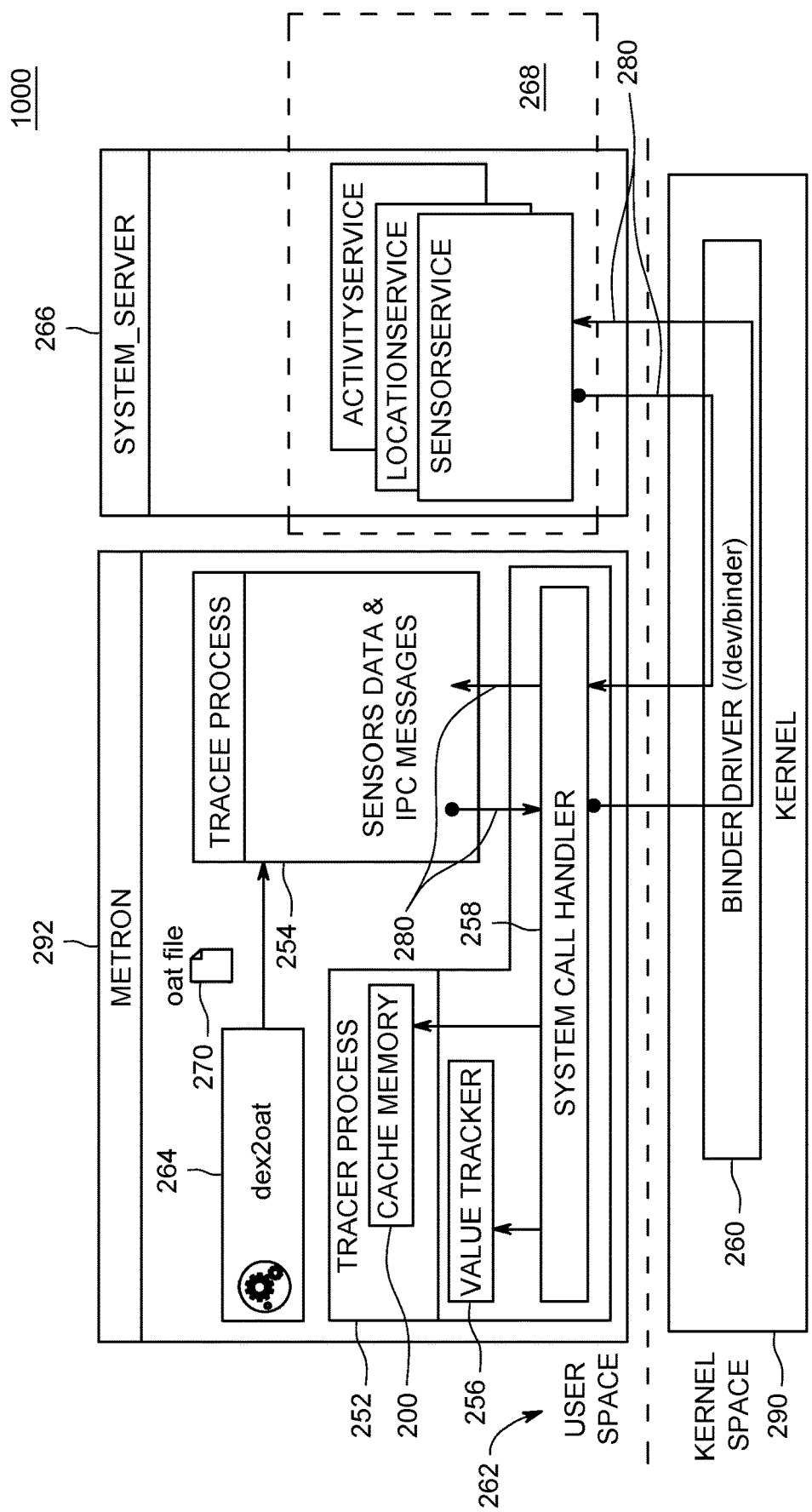
FIG. 2 is a schematic view of data flow and control in another example system (and method), according to some embodiments.

FIG. 2 illustrates data flow and control of another example system (and method) 1000, according to some embodiments. According to some embodiments, FIG. 2 also presents an overall software (computing) architecture. As illustrated in FIG. 2, some embodiments may be implemented as a user-space application 262 compatible with ANDROID (including but not limited to the modern versions of ANDROID, namely 5, 6, and/or 7). Some embodiments may evaluate experiments on ANDROID 5.0.1. Since ANDROID 5.0, ANDROID uses a new runtime mechanism named the ANDROID RUNTIME (ART) which uses ahead-of-time compilation to compile applications into native code upon their installation. According to some embodiments, this compilation may take place on a device using the DEX2OAT compiler 264 which outputs an OAT file 270 and provides the OAT file 270 as input to a tracee process 254. Some embodiments can be used on commodity ANDROID devices without either modifying the operating system or the application to be examined. While switching from DALVIK to ART may break legacy taint tracking solutions (e.g. Taint-Droid), some embodiments are compatible with the new runtime environment. APIs used by some embodiments may be allowed in ANDROID. A prototype of some embodiments may be uploaded to the GOOGLE PLAY-STORE and accepted without issues.

To investigate an installed third party application for data leakage, the user may start the target application through some embodiments. Some embodiments may rely on two mechanisms to perform analysis: (1) an application sand-boxing mechanism (of FIG. 1B) and (2) re-compiling the application APK file using a modified version of the DEX2OAT compiler 264 (of FIG. 2).

Referring back to FIG. 1B, the app sandboxing mechanism 206 enables the inspection of the data flowing into and/or out of the target application. This sand-boxing 206 (of FIG. 1B) is achieved through syscall interception of some embodiments. The compiler instrumentation 212 (of FIG. 1B) may be used to assess tracking the propagation of sensitive values through the numerical instructions performed by the application (210 of FIG. 1B). Some embodiments may use a modified version of the compiler to inject additional system calls within the target app ELF (more specifically, OAT file format) binary to transfer execution between the app and other functions in order to keep track of computations performed. The modified version of compiler may be included as a binary asset within the package of some embodiments. When an application is to be run for the first time within some embodiments, some embodiments may invoke the compiler to generate an instrumented binary file from the application DEX bytecode. Some embodiments do not replace the application existing binary file with our modified version, instead when an application is selected to run within some embodiments, some embodiments may rely on system-call interception to redirect the open system call to the path of the modified OAT file (214 of FIG. 1B).

Referring back to the overall system architecture of FIG. 2, some embodiments may include an instrumented version of the DEX2OAT compiler that is used to generate modified binary files for target applications. During runtime, some embodiments may possess two or more processes. One process may be a tracee process 254 within which the modified binary file of the target app is loaded and executed. The second process may be a tracer process 252 that intercepts system-calls 268 (including sensor data delivery, files and network access, and IPC messages) between the tracee process 254 which runs the target application and the ANDROID OS 260. System call interception 258 may be used to update the list of tainted values maintained by the value tracker 256 of some embodiments. System call interception 258 may also be used to detect the leakage of values by comparing the values being sent out by the tracee process 254 against the list of tainted values maintained by the value tracker.

Subsections 5.1 and 5.2 to follow respectively discuss the design and implementation the application sand-boxing and the instrumented compiler.

5.1 Application Sandboxing

The core component of some embodiments is a user-space level application sandboxing process that can be used to encapsulate the code of other third party applications during their execution. The techniques of implementing the application sandboxing having been recently demonstrated (see Backes, M., et al., "Boxify: Full-fledged App Sandboxing for Stock Android," In 24th USENIX Security Symposium (USENIX Security 15), pages 691-706, Aug. 12-14, 2015, which is incorporated by reference herein in its entirety and Bianchi, A., et al., "NJAS: Sandboxing Unmodified Applications in Non-Rooted Devices Running Stock Android," In Proceedings of the 5th Annual ACM CCS Workshop on Security and Privacy in Smartphones and Mobile Devices; ACM, pages 27-38, Oct. 12, 2015, which is incorporated by reference herein in its entirety). The two approaches use dynamic code loading and system-call interposition to implement the sand-boxing mechanism. Some embodiments may extend these approaches to implement information flow tracking which may run on top of unmodified versions of ANDROID system.

FIG. 2 illustrates the event sequence 280 of the user space 262 information flow-tracking. The tracer application spawns two processes under a same app: a tracee process 254 and another tracer process 252 which monitors and controls the tracee process 254. The target app is loaded and executed within the tracee process 254, while the tracer process 252 holds a fixed-size ring buffer 200 that stores the list of sensitive values received by the target application. When the target app receives new sensitive values, some embodiments may add a copy of this value to the ring buffer 200 of sensitive values, and when writing a value to the sink 204 (FIG. 1B), may inspect the values being written to the sink 204 to see if they match any of the sensitive values stored in the ring buffer 200. The compiler instrumentation described below leverages system-call injections within the target application in order to notify the tracer process 252 about the operations and operands about to be executed by the tracee process 254 and derive new computed values from sensitive values. One or more return values computed from tainted operands may be added to the tracer ring buffer 200.

Various configurations of the ring buffer 200, such as a value table or other cache, are suitable.

The section 5.1.1 below provides a brief background of ANDROID Binder IPC mechanism followed by the description of the implementation of the application sandbox, according to some embodiments.

5.1.1 ANDROID Binder. ANDROID may isolate running applications and system service by running them in separate processes with their own unique process identifier (known as "pid") and user identifier (known as "uid"). This prevents a malicious app from tempering with the memory and resources that belong to other applications. Different apps communicate with each other or with system services through RPC messages which are transported using the Binder inter-process communication framework. Binder may be a core component of the ANDROID OS that implements this light-weight IPC scheme used for communications between different apps and the system services. Higher level communication and data ex-change mechanisms in ANDROID such as intents, services, or content providers leverage the Binder framework. Binder may include two (or more) components: (1) the Binder kernel driver 260 that runs as a linux kernel component and is responsible for transferring IPC data between different processes and threads (it copies data from the memory space of one process, from an application to another target application, process and thread); and (2) the Binder user-space library (libbinder.so) is pre-loaded into each application memory space by the ZYGOTE application loader. This library takes care of communication with the binder kernel driver 260 to perform IPC with other applications and performs the data serialization (known as marshalling/unmarshalling to one skilled in the art) for the objects exchanged in the communication. It also includes a pool of threads (known as IPCThreadState) that may be continuously waiting for incoming binder requests to handle an incoming request.

As illustrated in FIG. 2, the kernel 290 may communicate with a system server 266 that may include one or more services 268. According to some embodiments, the interface between the process library 292 and the kernel 290 operates when the calling application initiates a Binder IPC via an IOCTL system call on a file descriptor open on "/dev/binder," which may correspond to the Binder kernel driver character device. The "ioctl" may contains a request code parameter that specifies the binder control operation. For example, the specific Binder command BINDER_WRITE_READ may be used for Binder RPC and data exchange messages. According to some embodiments, the calling application may also pass a pointer to a special data structure named binder_transaction_data which may encapsulate the payload for the RPC call.

5.1.2 Application sandboxing. According to some embodiments, sandboxing another application within some embodiments may be enabled by the help of dynamic code loading and system-call interception. First, some embodiments use ANDROID dynamic code loading APIs to load the code of the other application. Second, the embodiments setup an environment for intercepting system calls (including the IOCTL system-call used to perform the Binder transactions). Lastly, embodiments may start one or more activities of the target application while using system-call interposition to inspect and modify the content of the system calls and binder transactions payloads.

Loading the code of target app: ANDROID provides well documented APIs for dynamic code loading. The DexClassLoader class may act as a class loader that can be used load the classes from a given JAR or APK file. In addition, ANDROID provides the createPackageContext which can be used to create the context object of a given installed application. The return context object includes the application resources from its APK file and optionally, can include the application code as well, as illustrated in Listing 2.1 to follow:

```
Context target_context= getApplicationContext( ).createPacka
    geContext(targetPackageName,Context
.CONTEXT_IGNORE_ SECURITY |Context.CONTEXT_INCLU
    DE_CODE);
ClassLoaderloader= target_context.getClassLoader( );
```

Listing 2.1: Context Object

The security implications of dynamic code loading are discussed in existing works (see Falsina, L., et al., "Grab'n Run: Secure and Practical Dynamic Code Loading for Android Applications," In Proceedings of the 31st Annual Computer Security Applications Conference. ACM, pages 201-210, Dec. 7-11, 2015, which is incorporated by reference herein in its entirety).

Intercepting system calls: Before starting the code load from the target application, some embodiments establish the system call interception by using PTRACE system call. First, some embodiments use the fork system call to clone some embodiments into another process. Some embodiments call the new child process as the tracer. After making the fork system call, the process may allow the tracer to use PTRACE to control it, which may be performed by the following code:

prctl(PR_SET_DUMPABLE, 1, 0, 0, 0);
Listing 3: prctl System Call

Next, the tracer may make the following system call to attach its parent.
ptrace(PTRACE_ATTACH, parent_pid, 0, 0);
Listing 4: PTRACE System Call to Attach a Process In some embodiments, as a result, the process may become a tracee controlled by the tracer process. Consequently, the tracer may get interrupted for every system call made by the tracee. When interrupted, the tracer becomes able to read and modify the registers and memory content of its tracee.

Running the target application: With the system-call interposition ready, some embodiments now start activity of the target application by using the ClassLoader created from the target application context to load the activity class. Some embodiments wrap the loaded classes with an Intent wrapper and ask the ActivityManager frameworks service to start it by using StartActivity function call. While the normal behavior of ANDROID is to disallow applications to start the code loaded from other application packages in the same process, some embodiments make use of the system-call interception to modify the payload of the Binder transactions made by the StartActivity framework method call. Namely, some embodiments use the tracer process to modify the content of both the START_ACTIVITY_TRANSACTION, and SCHEDULE_LAUNCH_ACTIVITY_TRANSACTION taking place between the some embodiments application process (the tracee) and the ANDROID frame-work ActivityManagerService process. More details about the exact patching procedure can be found herein (see also reference 5).

After starting the target within the tracee which is monitored by the tracer, the tracer process has the responsibility to perform the following tasks:

a) Virtualizing the resources of the target application: In order to keep the target app running within the context of our tracee process, which is part of some embodiments, the tracer may virtualize the private resources of the target app such as the application components (e.g., Activities, Services) and the private data directory (/data/data/[application_package_name]). Files accessed under the private data directory of the target app package may be redirected to the private data directory of some embodiments by intercepting the files-related system calls. Also, when the target application attempts to start another activity from its own package, the tracer may intercept the Binder transactions to replace the package name of the activity to be started by the package name of the app. Then, when the ActivityManagerService responds by providing the ActivityInfo of the activity to be started, the tracer replaces it by an instance of the ActivityInfo obtained from the target app context some embodiments obtained by dynamic code loading.

b) Intercepting sensor values delivered to the application. The tracer process may intercept RPC messages between the tracee process, which runs the target app, and the sensors data sources within the ANDROID framework (e.g., SensorManagerService). For example, to intercept accelerometer and gyroscope values the application receives, some embodiments may intercept the GET_SENSOR_CHANNEL exchanged between the application and the framework SensorManagerService, which contains a descriptor for a network socket used to deliver sensor values to the application. Then, network socket ("recvfrom") system call may be intercepted to inspect the actual values delivered via the socket descriptor some embodiments have found. Sensor values may be added to a list of sensitive values maintained by some embodiments.

c) Intercepting file and network related system calls: The tracer may intercept file and network related system-calls to inspect the files written to files and network sockets for data leakage. Values written to files or network sockets may be checked against the list of sensitive values maintained by some embodiments.

d) Keeping track of propagation of tainted values with help of the compiler instrumentation, some embodiments describe later in subsection 5.2, some embodiments inject system calls into the target application ELF code so that tracer is interrupted when a numerical operation is being done by the tracee. Once interrupted, the tracer checks if the any of the numerical operation belongs to the list of sensitive values. If so, then the result of the operation is also added to the list of sensitive values.

5.2 Intercepting Numerical Operations

Until ANDROID 4.4 (KITKAT), ANDROID has relied exclusively on the DALVIK Virtual Machine as its runtime environment. Starting from ANDROID 4.4, a new runtime environment has been used as a re-placement for DALVIK. One of the features of this new runtime environment is the Ahead-of-Time compilation that transforms the DEX bytecode that is embedded in and ANDROID application to optimized native code. This ahead-of-time compilation is a one-time operation performed during the app installation. The compilation process is performed using the DEX2OAT utility that acts a compiler for DEX bytecode. The resulting binary is an ELF executable with the application DEX code embedded in it for debugging purposes. The compilation takes place in two phases. The first phase transforms each sequence of DEX instructions into a linked list of instructions corresponding to the opcodes, denoted to as the MIR representation. The second phase transforms the MIR representation to a platform specific representation, (referred to as LIR). Both steps may include optimization phases such as garbage collection optimizations and improved register mapping among others. Finally, the compiler may generate a native code from the LIR representation.

Unfortunately, system-call interception, established by the app sandboxing technique discussed earlier in Section 5.1, allows us to inspect values read from "sources" (e.g. sensor readings such as accelerometer are received through a network socket "recvfrom" system call) and values sent to "sinks" (which are leaked by either network sockets, written to file, or passed through Binder RPC to another application). However, system-call interposition may not provide information about the computations applied to the sensitive values after being read from the "source" and before being sent to the "sink." Using this information, some embodiments may be able to identify the sensitive value leakage when they are leaked in the raw values read from the "source" and may detect the information leakage caused by leaking computed functions (i.e. inferences) from the sensitive values. Some embodiments may rely on compiler instrumentation by shipping a modified version of the DEX2OAT compiler. Some embodiments may run the modified compiler on the application CLASSES.DEX file (which is accessible under the "/data/code/[package_name]" directory) to generate a modified oat file. When the application is started through some embodiments, dynamic code loading API loads the application oat file. Through system-call interception, some embodiments redirect the file open system call to the location of the modified oat file.

The goal of our modified DEX2OAT compiler is to instrument the numerical operation instructions within (add-*, sub-*, mul-*, div-*, as examples) within the application. Specifically, the compiler adds an arbitrary selected unused system call number, 382, before any floating point operation in the code. The placement of this system call before the operation is important, as it allows the interception mechanism to handle instructions such as add, sub, div, and/or mul-2addr which may use the first register both to provide an operand and store the return value. According to some embodiments, the "syscall" may be intercepted within applications that may be running. Then some embodiments are able to inspect the operands and then the return values of numerical operations the application is performing. ANDROID leverages hardware functionalities, when available, to speed up floating point operations. In particular, ANDROID makes use of the ARM Floating Point architecture (VFP) to handle floating point operations. This architecture is compliant with the IEEE 754 norm. The VFP architecture uses a set of registers of either 32 or 64 bits' size that are dedicated to floating point operations. As a debugging feature, these registers can be retrieved via the PTRACE syscall. Some embodiments use the capstone library to read the numerical expression and the parameters that are executed next. By looking up the VFP registers that correspond to the operand some embodiments read the numerical values and look them up in the ring buffer.

FIG. 3 illustrates example code Listings 5-8 (elements 302, 304, 306, 308, respectively). An example for Java code snippet for an ANDROID application that manipulates numerical values is shown in Listing 5 (element 302). The equivalent DEX bytecode is given in Listing 6 (element 304). The native assembly code generated by compiling this DEX bytecode by our modified compiler is shown in Listing 7 (element 306). Instructions injected due to our compiler extensions are marked with a '+' next to them. Listing 8 (element 308) presents a part of the modifications some embodiments made to the DEX2OAT compiler source code. Some embodiments first save the register 7 and 0 that respectively contain the system call number and the return of the sys-call. The syscall number some embodiments inject is unknown to the kernel and may be ignored for it. However, the system call number may be intercepted, according to some embodiments, as a marker that a floating point instruction is being executed. Then some embodiments may pick the registers of target application process (i.e., tracee) to inspect the operands and return values of the numerical operation. Finally, some embodiments resume the application execution by restoring the original values of the registers R7 and R0.

In addition, in order to compare the precision of this solution versus existing solutions, some embodiments ported back design to ANDROID version 4.3_r1 to compare their performance with previous implementations in section 6.

Section 6—Evaluation

Some embodiments may perform different experiments to evaluate the performance overhead and taint tracking accuracy. Some embodiments compare results to the state of art information flow tracking solutions using both the DROID-BENCH benchmark and popular real-world application that manipulate sensors values. Sections 6.1 and 6.2 provide the results of some embodiments' performance overhead and flow tracking accuracy, respectively.

6.1 Performance Overhead 6.1.1 Computation overhead. The extra overhead added by some embodiments correspond to the applications can be attributed to the following factors: (1) the overhead due to running the application inside the some embodiments sandbox instead of running it directly on top of the ANDROID OS; (2) the overhead due to the additional instructions injected by the modified DEX2OAT compiler; (3) the overhead due to looking up the values of numerical operations operands into the ring-buffer to perform taint propagation. This section provides the result of our evaluation for these three factors.

(1) Overhead due to running inside the sandbox: running the application within a virtualized environment (i.e., sandbox) provided by some embodiments allows some embodiments to dynamically examine the application behavior while running without having to modify the operating system or the application (APK) package. This advantage comes at the cost of runtime penalty due to the interception and modification of the system-calls and binder transactions. Some embodiments measure the virtualization overhead on popular real-world applications downloaded from the PLAY-STORE. Some embodiments run each app in two modes: running natively on top of the OS and running within the sandbox. For each mode, some embodiments conduct five experiments and report the median of time it takes to start the application activity. Some embodiments may measure the time period spent since the framework StartActivity method is called to start the application until the application is loaded and the life-cycle of the activity is started by its OnCreate method finishes.

Table 2 to follow shows that the first two apps are launched around 36% slower when started within the sandbox. The third application (Free Pedometer) experiences more severe slow-down during the launch because it performs more operations to load and initialize third party ads and application analytics libraries during its execution. Also, it setups a reads/writes data to a private SQLite database.

TABLE 2

Application launch overhead

| Application | Native Execution | Sandboxed Execution | |
|---|---|---|---|
| ANDROID SensorBox | 455 ms | 620 ms | (136%) |
| Mobile LINPACK | 813 ms | 1119 ms | (137%) |
| Free Pedometer | 1442 ms | 8596 ms | (590%) |

(2) Overhead due to instrumenting numerical operations

The additional system calls that are injected by the modified DEX2OAT compiler in order to intercept the operands and return values of floating point operations also add a runtime overhead. To measure this overhead, some embodiments use the Mobile UNPACK benchmark which uses CPU-intensive floating point performance benchmarking applications. Some embodiments compare the scores while running: (a) natively on top of OS; (b) within sandbox without instrumenting floating points; and (c) within the sandbox while instrumenting floating points. The results are shown below in Table 3.

Table 3 to follow shows when the application runs within the sandbox while intercepting the additional system calls injected by the modified DEX2OAT compiler. The benchmarking score for floating points operation shows a throughput is 460 times slower. Despite how prohibitive is this cost, some embodiments emphasize that this micro-benchmark is floating-point intensive, while in real apps the numerical operations constitute a very small faction of the whole application code (0.42% according the statistics in Table 1 for a general app versus 29.35% for the UNPACK benchmark (70% more operations)). Therefore, the slowdown overhead of the whole app runtime is amortized due to the small fraction of operations the costly numerical operations. The overhead of system call tracing having studied in (see System call overhead. http://www.linux-kongress.org/2009/slides/system_call_tracing_overhead_joerg_zinke.pdf, which is incorporated by reference herein in its entirety).

TABLE 3

Numerical operations benchmarks

| Benchmark | Native Execution | Sandbox & Num. Op. Interception |
|---|---|---|
| LINPACK Mobile | 4.6 Mflops | 0.01 Mflops |

(3) Overhead Due to Looking Up Values in the Ring Buffer

Figure 4:
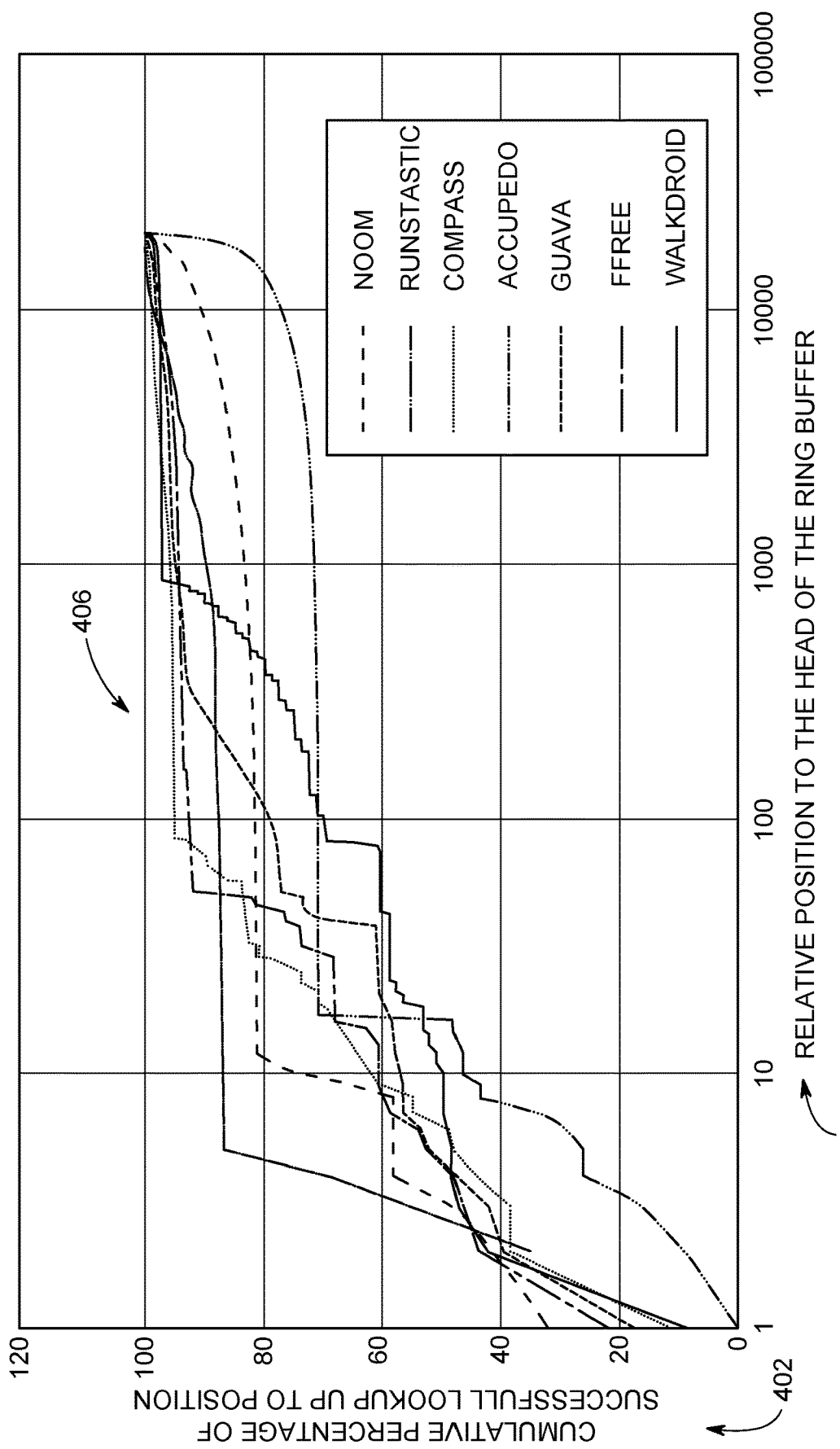
FIG. 4 is a graph showing a cumulative percentage of successful lookups on the ring buffer, at each position, for a previously recorded tainted value, according to some embodiments.

FIG. 4 shows the cumulative percentage of successful lookups 402 on the ring buffer at each position 404 (relative to the head) for a previously recorded tainted value for varying applications 406. This analysis shows that between 42% and 83% of the lookups for tainted values succeed by looking up the 10 last inserted values in the ring buffer. That justifies the design tradeoff described earlier for which a linear search on the last few values inserted is performed first (in this example, on the 5 last values) followed by a tree based search if any of the first values was a match. In this specific example, some embodiments use a 20,000 value ring buffer. An average binary tree search in the ring buffer may thus require 15 comparisons maximum. The overhead added by this lookup operation may be high, as shown in Table 1n but since the number of floating point operations in general purpose apps is generally low, the overall overhead is reasonable.

6.1.2 Memory Requirement. According to some embodiments, the size of the ring buffer may influence the detection of flows. Depending on the length of computations applied to the floating point values, the ring buffer is preferably designed to be large enough to store enough values by the time a value reaches a sink. The size of the ring buffer is left to the decision of the user. Some embodiments noticed that a buffer of 20,000 values was large enough to perform as least as well as TAINTDROID opcode taint propagation for the applications considered herein.

6.2 Flow Tracking Accuracy

The following evaluates some embodiments in terms of the information flow detection accuracy. Some embodiments conduct two kinds of evaluation experiments. First, some embodiments evaluate the accuracy of some embodiments against the DROIDBENCH benchmarking dataset. Some embodiments compare some embodiments against TAINTDROID and BAYESDROID. DROIDBENCH provides some embodiments with fine grained comparison about the different kinds of information flow that can be detected by each solution. Second, some embodiments evaluate the practicality of the system by using it to examine information flow made by real applications installed from the ANDROID market.

Figure 5:
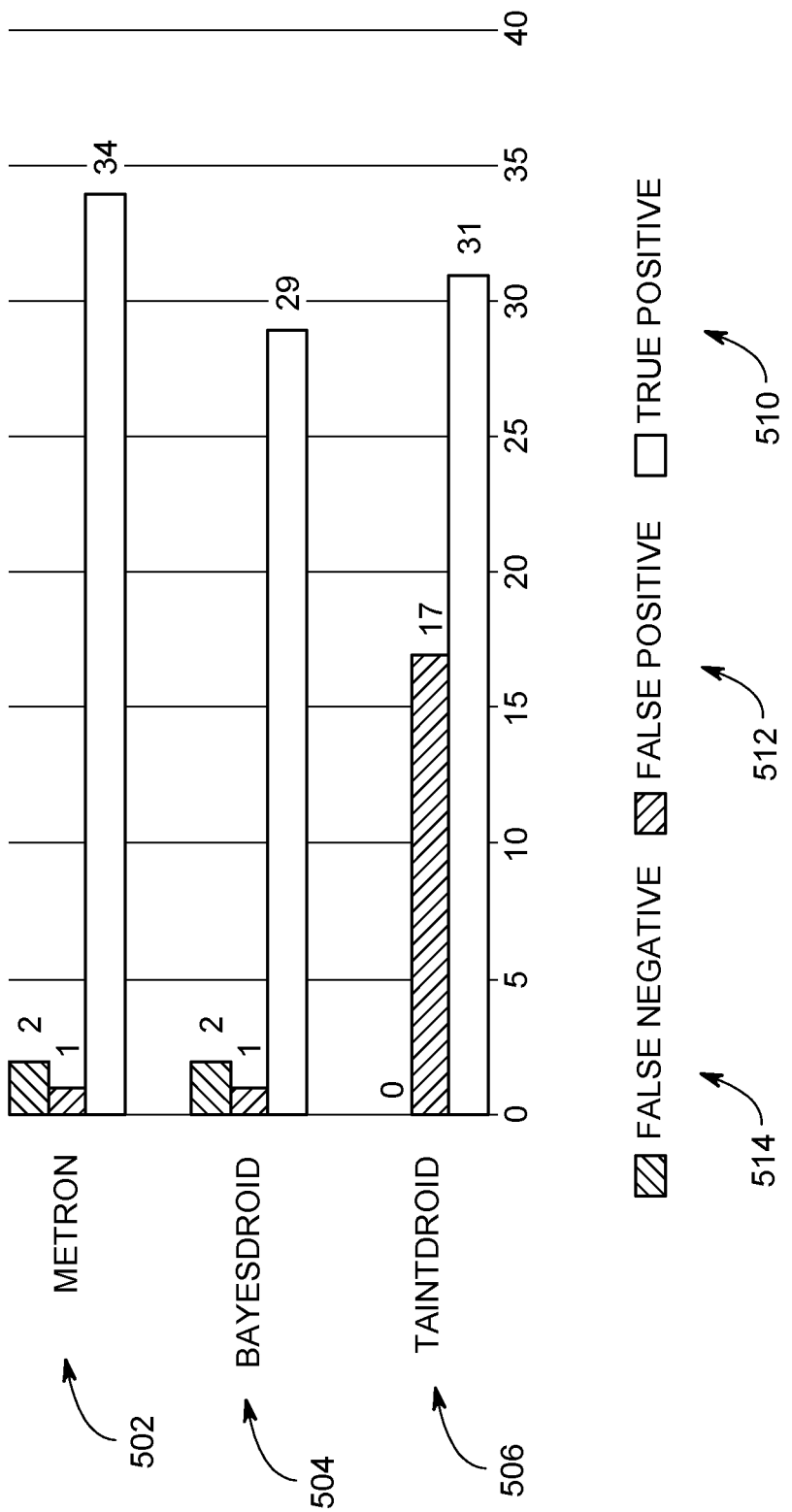
FIG. 5 shows DROIDBENCH results comparison between some embodiments, BAYESDROID and TAINT-DROID.

6.2.1 DROIDBENCH:

FIG. 5 shows DROIDBENCH test results for TAINTDROID 506, BAYESDROID 504 and the method (and system) 502 of some embodiments. The method (and system) 502 scores 34 true positives (element 510) compared to 31 and 29 true positives (element 510) by TAINTDROID 506 and BAYESDROID 504, respectively. Also, the method (and system) 502 of some embodiments significantly improves in terms of false positives compared to TAINTDROID 506. As illustrated in FIG. 5, the method (and system) 502 of some embodiments, and BAYESDROID, reported one false positive 512 while TAINTDROID reported 17 cases. Both BAYESDROID and some embodiments report the same number of false negatives (2 false negatives) 514. The two false negative results are due to the two string (and/or other digital representation or value) obfuscation tests Loop1 (See https://github.com/secure-software-engineering/DROIDBENCH/blob/master/eclipse-project/GeneralJava/Loop1/src/de/ecspride/LoopExample1.java) and an ImplicitFlow1 (See https://github.com/secure-software-engineering/DROIDBENCH/blob/master/eclipse-project/ImplicitFlows/ImplicitFlow1/src/de/ecspride/ImplicitFlow1.java). The ImplicitFlow1 test is particularly interesting: it generates two data leaks from the sensitive value using implicit flows. Both implicit flows are based on correspondence tables. The first test obfuscates the sensitive value while the second correspondence table leads to the creation of the original string (and/or other digital representation or value). Since some embodiments rely on the representation of the value at the sink in order to detect a flow, this second implicit flow is actually detected. However, in general, some embodiments do not support implicit flow. Some embodiments and BAYESDROID false positive is due to the PrivateDataLeak3 test (See https://github.com/secure-software-engineering/DROIDBENCH/blob/master/eclipse-project/ANDROIDSpecific/PrivateDataLeak3/src/de/ecspride/MainActivity.java). This test first may write a sensitive value to a file and then send the data out via SMS. The leak may occur when the data is sent via SMS. In term of flow, the detection at the file operation is legitimate. In term of leak, if the solution covers the file access a sink, it is indeed a false positive information leak. Overall, some embodiments may provide more robust results than TAINTDROID while being able to track the flow of numerical values which are not supported by BAYESDROID. The detailed evaluation results of DROIDBENCH experiment are show in Table 7 to follow.

Unfortunately, DROIDBENCH results consider a subset of possible configurations of flows observable in a system. Some embodiments address this problem by investigating flows on different types of applications taken from the market.

6.2.2 Taint detection accuracy on real-world applications. In addition to the DROIDBENCH detection accuracy, some embodiments are compared with TAINTDROID taint detection while running popular real-world applications downloaded from the GOOGLE application store. Some embodiments chose popular applications that manipulate sensor values, including but not limited to pedometer and fitness tracking applications.

According to some embodiments, the value-based information flow tracking approach may be ported to ANDROID 4.3_r1 in order to run it side by side with TAINTDROID [11] and evaluate both of them in terms taint detection accuracy. According to some embodiments, how many tainted operations were missed on each side is determined. Table 4 to follow presents the corresponding results. Several observations can be extracted from this table. First, by comparing the total number of instructions executed versus the number of numerical operations executed some embodiments it is discovered that this last group represents less than 10% of the total number of instruction. As an accuracy evaluation, the method (and system) 502 of some embodiments may record the number of detected instructions manipulating tainted values. The number of instructions detected by TAINTDROID may be higher than the number of instructions detected by the method (and system) 502, according to some embodiments. However by looking closer at individual results, the difference between these detection numbers may be due to two reasons. The first reason is that TAINTDROID did generate several false positive flows. For the first three applications reported in Table 4, TAINTDROID raised a false positive alert and some embodiments did not. These false positive alerts are dues to a wrongly tainted array in TAINTDROID. Naively, TAINTDROID marks a whole array as tainted even when one value within the array is tainted. It may not be uncommon for pedometer applications to use arrays to store temporary computation results. Therefore, a false positive may be raised whenever any part of array is sent to a sink.

Table 5 to follow examines two popular real-world applications manipulating accelerometer values for information flow tracking. Table 5 provides the case of two information leakage cases some embodiments captured. The method (and system) 502 of some embodiments also may report the history of operations that are used to compute the leaked value. The method (and system) 502 of some embodiments may indicate whether the raw sensor value is leaked or a computed function of some embodiments. Listing 2 shows a sample output of the detection mechanism at the sink for the Accupedo application. In this sample, the method (and system) 502 of some embodiments contributes of the accelerometer values for the X axis (denoted with the S0 prefix) at several time intervals (suffixes_XXX). Likewise, investigation of the Guava app revealed flow of values directly recorded from the sensor on the Z-axis.

Section 7—Discussion

Handling non-numerical values: Some embodiments are designed to track the flow of numerical values. However, some embodiments are not so limited. While numerical values represent most of sensitive information (e.g. accelerometer and GPS data), sensitive values can be exist in different forms such as strings (and/or other digital representations or values). Complementary approaches for value-tracking such as BAYESDROID which track the flow of strings (and/or other digital representations or values) can be used jointly with some embodiments to provide exhaustive covering of sensitive values tracking.

System call interception overhead: As reported in subsection 6.1, the PTRACE system call interception may add significant runtime overhead due to the context-switching between the tracer and tracee. This has been studied previously in [1]. Some embodiments may use PTRACE system-call interception to update the list of tainted values. According to some embodiments, a possible method to reduce overhead may be to use shared memory between the tracee and tracer to store the list of tainted values and rely on the compiler instrumentation to inject instructions to update this shared memory buffer. According to some embodiments, this may add more changes to the DEX2OAT compiler.

Handling implicit information flows: Listing 9 shows a code snippet from the GOOGLE open-source sample pedometer application. According to some embodiments, the number of steps may be incremented based on threshold conditions on the velocity and timestamps.

Listing 9: The Case of Implicit Information Flow in the GOOGLE Sample Pedometer Application

```
// velocityEstimate and oldVelecityEstimate are
calculated from accelerometer data
if ( velocityEstimate > STEP THRESHOLD &&
oldVelocityEstimate <= STEP THRESHOLD &&
( timeNs −lastStepTimeNs > STEP_DELAY_NS )) {
step ++; // implicit flow !
lastStepTimeNs = timeNs ;
}
oldVelocityEstimate = velocityEstimate;
```

Rewriting the native libraries by injecting additional system-calls to track the propagation of sensitive values through numerical operations within the native library can be achieved, according to some embodiments.

Risk Analysis of information leakage: Some embodiments may provide the user with insights about the values being leaked by applications. Some embodiments are capable of providing the user with a log of history of operations that are used to compute the leaked values. This operations history can provide a good basis about how to quantify the risk associated with the computed values.

TABLE 4

Taint Tracking comparison of some embodiments (METRON) versus TAINTDROID (TD)

| App Name | # tot Inst. | # num inst. | # TD taint inst. | # METRON taint inst. | comment |
|---|---|---|---|---|---|
| Accupedo | 45550000 | 3935741 (8.64%) | 217587 | 217585 (217585 fp) | TD array false positives |
| Ffree | 22350000 | 1524497 (6.82%) | 22068 | 20709 (11368 fp) | TD array false positives |
| Noom | 46650000 | 4536839 (9.73%) | 210138 | 209072 (93714 fp) | TD array false positives |
| Runtastic | 130750000 | 11304888 (8.65%) | 10985 | 10985 (10985 fp) | Identical flow detection |

TABLE 5

Flow observed in several fitness tracking application

| Application name | Flow observed | Notes |
|---|---|---|
| Guava | Z accelerometer value saved to file | Raw sensor values leaked |
| Accupedo | Value lapdistance saved to a file | Leaked value computed from multiple sensor measurements |

Section 8—Related Work

Dynamic information flow tracking: The state of the art in information flow tracking on ANDROID is TAINTDROID. In terms of granularity, TAINTDROID provides up to a variable-based information flow tracking system. TAINTDROID attaches shadow memory integer values (taints) for one or more variables or objects stored in the system memory. TAINTDROID suffers from reporting many false positive alarms. BAYESDROID is implemented a variation of TAINTDROID to reduce the false positives rate. BAYESDROID uses Bayesian reasoning and the hamming distance between strings (and/or other digital representations or values) read at the source and to string (and/or other digital representation or value) detected at the sink in order to detect flows. However, in contrast to some embodiments, BAYESDROID is limited to tracking string values (and/or other digital representation or values) and does not track numerical values. In addition, both TAINTDROID and BAYESDROID are implemented on top of the DALVIK VM which is replaced by the Ahead-Of-Time compilation via the ART compiler. Therefore, TAINTDROID and BAYESDROID are require OS modification and are not compatible with new versions of ANDROID.

Protections against unwanted inferences from sensor data are presented in previous research such as IPSHIELD (see r hakraborty, S., et al., "ipShield: A Framework For Enforcing Context-Aware Privacy," In Proceedings of the 11th USENIX Conference on Networked Systems Design and Implementation. USENIX Association, pages 143-156, Apr. 2-4, 2014, which is incorporated by reference herein in its entirety) which implements a firewall for sensors data. In some embodiments, protection mechanisms may use custom versions of ANDROID.

Recently, existing approaches (see "TaintART: A Practical Multi-level Information-Flow Tracking System for Android Runtime," In Proceedings of the 2016 ACM SIGSAC Conference on Computer and Communications Security. ACM, pages 331-342, Oct. 24-28, 2016, which is incorporated by reference herein in its entirety) presented preliminary research for how to revive dynamic information tracking under the new ANDROID RUNTIME (ART) environment. Similar to some embodiments, the three solutions modify the DEX2OAT compiler. Some embodiments may present a way to achieve taint tracking with minimal compiler modifications and therefore making it easier to port some embodiments to future versions of ANDROID.

Programming languages such as Jeeves (see r ang, J., et al., "A Language for Automatically Enforcing Privacy Policies," In POPL '12, Proceedings of the 39th Annual ACM SIGPLAN-SIGACT Symposium on Principles of Programming Languages, pages, 85-96, Jan. 25-27, 2012, which is incorporated by reference herein in its entirety) enable the developer to define fine-grained information flow rules in the application code.

Application sandboxing techniques: BOXIFY and NJSAP demonstrate how to encapsulate the execution of a third party application with a virtualized environment. While NJSAP may use PTRACE for system-call interception, NJSAP may use LIBC function hooking. Some embodiments show comparable results in terms of virtualization overhead while extending the sandboxing environment to implement a working value-tracking environment by coordination with a modified version of DEX2OAT compiler. Both execution both techniques (BOXIFY and NJSAPO) rely on syscall introspection in order to allow the execution of a third party application in the context of another application. Another approach to instrument an application without modifying either the system or the application may include hooking virtual methods. ARTDROID (see Costamagna, V., et al., "ARTDroid: A Virtual-Method Hooking Framework on Android ART Runtime," Proceedings of the Workshop on Innovations in Mobile Privacy and Security IMPS at ESSoS'16, London, UK, 9 pages, Apr. 6, 2016, which is incorporated by reference herein in its entirety) provides such a solution. While this approach can be of some use for specific task, some embodiments opt for the combination of a modified compiler with syscall interception to achieve an opcode granularity.

Strict app sandboxing to protect against private data disclosures has been proposed in FLASKDROID (see Bugiel, S., et al., "Flexible and Fine-Grained Mandatory Access Control on Android for Diverse Security and Privacy Policies.". In Usenix security, pages 131-146, Aug. 14-16, 2013, which is incorporated by reference herein in its entirety) and SAINT (see Ongtang, M., et al., "Semantically Rich Application-Centric Security in Android. Security and Communication Networks Vol. 5, Issue 6, pages 658-673, June 2012, which is incorporated by reference herein in its entirety) that extend the existing permission policies by ANDROID applications. BLUEBOX (see Bluebox. 2014. (2014). https://bluebox.com/, which is incorporated by reference herein in its entirety) provides a per-app data encryption mechanism, and corporate data access tracking.

Some embodiments present a dynamic information flow tracking solution. Some embodiments may run at the application-level without having to modify the underlying operating system or requiring elevated privileges to examine other apps. Some embodiments may utilize a new approach for tracking information flows based on the values themselves instead of attaching taint variables to them. Compared to previous work on dynamic information flow tracking, some embodiments may work on top of the latest commodity ANDROID versions. Some embodiments achieve better results than TAINTDROID (fewer false positives), and can handle numerical values which are not covered by BAYESDROID. Further details are provided in Sections A.1 and A.2 to follow.

A.1 Package Names and Versions of Real-World Applications Using for Evaluation

TABLE 6

App name to application package name and version correspondence table

| App name | App package name | Version |
|---|---|---|
| Accupedo | com.corusen.accupedo.te | 5.9.8 |
| Ffree | com.ffree.Pedometer | 2.6.0 |
| Noom | com.noom.walk | 1.4.0 |
| Runtastic | com.runtastic.ANDROID.pedometer.lite | 1.6.2 |
| Guava | com.guava.pedometer.step counter | 2.3.0 |

TABLE 6-continued

App name to application package name and version correspondence table

| App name | App package name | Version |
|---|---|---|
| SensorBox | imoblife.ANDROIDsensorbox | 5.0 |
| UNPACK | com.sqi.LINPACKbenchmark | 1.4 |

A.2 DROIDBENCH Benchmark Results

Table 7 presents the detailed DROIDBENCH results for three IFT solutions: some embodiments, BAYESDROID and TAINTDROID.

TABLE 7

Table: Comparison of the METRON performance (according to some embodiments) over the existing solutions: TAINTDROID, DROIDSAFE.

| Benchmark | Algorithm | TP | FP | FN |
|---|---|---|---|---|
| ActivityCommunication | METRON | 1 | 0 | 0 |
|  | BayesDroid | 1 | 0 | 0 |
|  | TaintDroid | 1 | 0 | 0 |
| ActivityLifecycle1 | METRON | 1 | 0 | 0 |
|  | BayesDroid | 1 | 0 | 0 |
|  | TaintDroid | 1 | 0 | 0 |
| ActivityLifecycle2 | METRON | 1 | 0 | 0 |
|  | BayesDroid | 1 | 0 | 0 |
|  | TaintDroid | 1 | 0 | 0 |
| ActivityLifecycle4 | METRON | 1 | 0 | 0 |
|  | BayesDroid | 1 | 0 | 0 |
|  | TaintDroid | 1 | 0 | 0 |
| Library2 | METRON | 1 | 0 | 0 |
|  | BayesDroid | 1 | 0 | 0 |
|  | TaintDroid | 1 | 0 | 0 |
| Obfuscation1 | METRON | 1 | 0 | 0 |
|  | BayesDroid | 1 | 0 | 0 |
|  | TaintDroid | 1 | 0 | 0 |
| PrivateDataLeak3 | METRON | 1 | 1 | 0 |
|  | BayesDroid | 1 | 1 | 0 |
|  | TaintDroid | 1 | 1 | 0 |
| AnonymousClass1 | METRON | 2 | 0 | 0 |
|  | BayesDroid | 0 | 0 | 0 |
|  | TaintDroid | 0 | 1 | 0 |
| ArrayAccess1 | METRON | 0 | 0 | 0 |
|  | BayesDroid | 0 | 0 | 0 |
|  | TaintDroid | 0 | 1 | 0 |
| ArrayAccess2 | METRON | 0 | 0 | 0 |
|  | BayesDroid | 0 | 0 | 0 |
|  | TaintDroid | 0 | 1 | 0 |
| HashMapAccess1 | METRON | 0 | 0 | 0 |
|  | BayesDroid | 0 | 0 | 0 |
|  | TaintDroid | 0 | 1 | 0 |
| Button1 | METRON | 1 | 0 | 0 |
|  | BayesDroid | 1 | 0 | 0 |
|  | TaintDroid | 1 | 0 | 0 |
| Button3 | METRON | 2 | 0 | 0 |
|  | BayesDroid | 2 | 0 | 0 |
|  | TaintDroid | 2 | 0 | 0 |
| Ordering1 | METRON | 0 | 0 | 0 |
|  | BayesDroid | 0 | 0 | 0 |
|  | TaintDroid | 0 | 2 | 0 |
| RegisterGlobal1 | METRON | 1 | 0 | 0 |
|  | BayesDroid | 1 | 0 | 0 |
|  | TaintDroid | 1 | 0 | 0 |
| DirectLeak1 | METRON | 1 | 0 | 0 |
|  | BayesDroid | 1 | 0 | 0 |
|  | TaintDroid | 1 | 0 | 0 |
| FieldSensitivity2 | METRON | 0 | 0 | 0 |
|  | BayesDroid | 0 | 0 | 0 |
|  | TaintDroid | 0 | 1 | 0 |
| FieldSensitivity3 | METRON | 1 | 0 | 0 |
|  | BayesDroid | 1 | 0 | 0 |
|  | TaintDroid | 1 | 0 | 0 |
| FieldSensitivity4 | METRON | 0 | 0 | 0 |
|  | BayesDroid | 0 | 0 | 0 |
|  | TaintDroid | 0 | 1 | 0 |

TABLE 7-continued

Table: Comparison of the METRON performance
(according to some embodiments) over the
existing solutions: TAINTDROID, DROIDSAFE.

| Benchmark | Algorithm | TP | FP | FN |
|---|---|---|---|---|
| ImplicitFlow1 | METRON | 1 | 0 | 1 |
| | BayesDroid | 0 | 0 | 2 |
| | TaintDroid | 2 | 0 | 0 |
| InheritedObject1 | METRON | 1 | 0 | 0 |
| | BayesDroid | 1 | 0 | 0 |
| | TaintDroid | 1 | 0 | 0 |
| ListAccess1 | METRON | 0 | 0 | 0 |
| | BayesDroid | 0 | 0 | 0 |
| | TaintDroid | 0 | 1 | 0 |
| LocationLeak1 | METRON | 2 | 0 | 0 |
| | BayesDroid | 0 | 0 | 0 |
| | TaintDroid | 0 | 2 | 0 |
| LocationLeak2 | METRON | 2 | 0 | 0 |
| | BayesDroid | 0 | 0 | 0 |
| | TaintDroid | 0 | 2 | 0 |
| Loop1 | METRON | 0 | 0 | 1 |
| | BayesDroid | 1 | 0 | 0 |
| | TaintDroid | 1 | 0 | 0 |
| Loop2 | METRON | 0 | 0 | 0 |
| | BayesDroid | 1 | 0 | 0 |
| | TaintDroid | 1 | 0 | 0 |
| ApplicationLifecycle1 | METRON | 1 | 0 | 0 |
| | BayesDroid | 1 | 0 | 0 |
| | TaintDroid | 1 | 0 | 0 |
| ApplicationLifecycle3 | METRON | 1 | 0 | 0 |
| | BayesDroid | 1 | 0 | 0 |
| | TaintDroid | 1 | 0 | 0 |
| MethodOverride1 | METRON | 1 | 0 | 0 |
| | BayesDroid | 1 | 0 | 0 |
| | TaintDroid | 1 | 0 | 0 |
| ObjectSensitivity1 | METRON | 0 | 0 | 0 |
| | BayesDroid | 0 | 0 | 0 |
| | TaintDroid | 0 | 1 | 0 |
| ObjectSensitivity2 | METRON | 0 | 0 | 0 |
| | BayesDroid | 0 | 0 | 0 |
| | TaintDroid | 0 | 2 | 0 |
| Reflection1 | METRON | 1 | 0 | 0 |
| | BayesDroid | 1 | 0 | 0 |
| | TaintDroid | 1 | 0 | 0 |
| Reflection2 | METRON | 1 | 0 | 0 |
| | BayesDroid | 1 | 0 | 0 |
| | TaintDroid | 1 | 0 | 0 |
| Reflection3 | METRON | 1 | 0 | 0 |
| | BayesDroid | 1 | 0 | 0 |
| | TaintDroid | 1 | 0 | 0 |
| Reflection4 | METRON | 1 | 0 | 0 |
| | BayesDroid | 1 | 0 | 0 |
| | TaintDroid | 1 | 0 | 0 |
| SourceCodeSpecific1 | METRON | 5 | 0 | 0 |
| | BayesDroid | 5 | 0 | 0 |
| | TaintDroid | 5 | 0 | 0 |
| StaticInitialization1 | METRON | 1 | 0 | 0 |
| | BayesDroid | 1 | 0 | 0 |
| | TaintDroid | 1 | 0 | 0 |
| Total | METRON | 34 | 1 | 2 |
| | BayesDroid | 29 | 1 | 2 |
| | TaintDroid | 31 | 17 | 0 |

Figure 6:
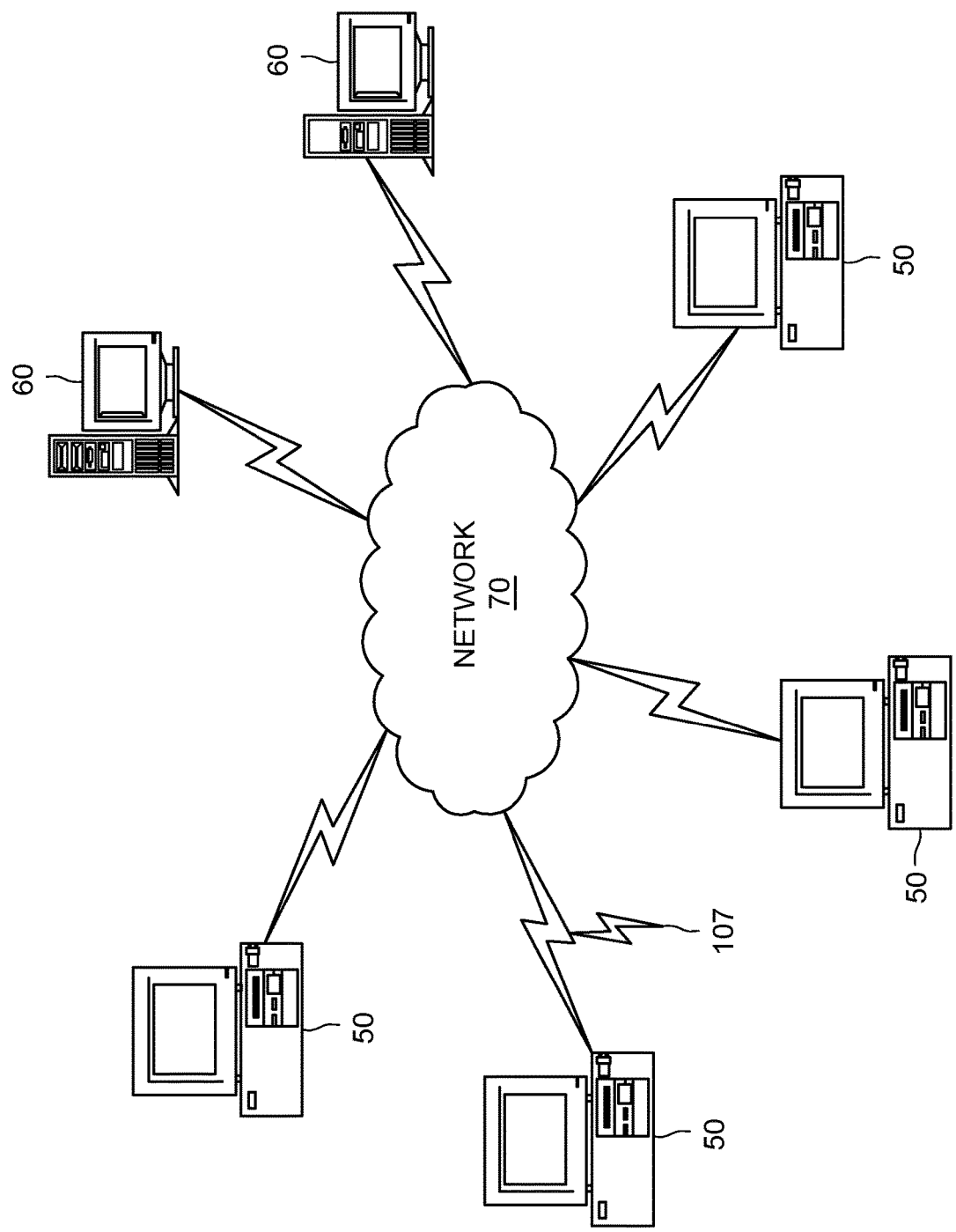
FIG. 6 is a schematic view of a computer network system or similar digital processing environment, according to some embodiments.

Computer System:

FIG. 6 illustrates a computer network (and system) or similar digital processing environment, according to some embodiments 1000. Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured with a computing module. Server computers 60 may be configured with a data module which communicates with client devices (i.e., computing modules) 50 for improving computer security (including but not limited to user data protection) of a device using value based information flow tracking. The server computers 60 may not be separate server computers but part of cloud network 70. In some embodiments, the server computer (e.g., display module) may enable users to improve computer security (including but not limited to user data protection) of a device using value based techniques (described herein) that may be located on the client 50, server 60, or network 70 (e.g., global computer network). The client (computing module) 50 may communicate information regarding the system back to and/or from the server 60 (data module). In some embodiments, the client 50 may include client applications or components (e.g., computing module) executing on the client 50 for generating or receiving (or accessing) data, and the client 50 may communicate this information to the server (e.g., data module) 60.

In other words, according to some embodiments, the computer system of FIG. 6 may include a data module 60 configured to automatically capture one or more raw data values from a data source of a device. The data module 60 may further be configured to store the one or more raw data values in a collection of sensitive data. The computing module 50 may be operatively coupled to the data module 60. The computing module 50 may be configured to track whether one or more computed values of the one or more functions of the data flow are included in the collection of sensitive data. The computing module 50 may be further configured, based upon the tracking, to prevent one or more values of the collection of sensitive data from being transmitted from a sink of the device.

The computing module 50 may be further configured to track whether one or more representations (including but not limited to digital, value, digital value, or string representations) of one or more computed operand and return values of one or more numerical or arithmetic operations of the one or more functions of the data flow are included in the collection of sensitive data. The data module 60 may perform storing in response to one or more security policies. The computing module 50 may perform tracking while the data flow is being accessed and processed. The device may include a mobile device, an embedded controller, and/or a computer processing device (including but not limited to a desktop computer, laptop computer and/or custom computer). The memory 90 may include a cache memory that may be configured as any of a ring buffer, a value table, and an array. The data source may include a sensor. The one or more raw data values may be readings of the sensor. The sensor may be of a data type configured to generate sensitive data. The sink may include any of a network socket, a file, or a message.

According to some embodiments, the computing module 50 may further be configured to report a violation based upon the tracking. In response to the reported violation, the computing module 50 may further block the one or more values of the collection of sensitive data from being transmitted from the sink of the device.

Figure 7:
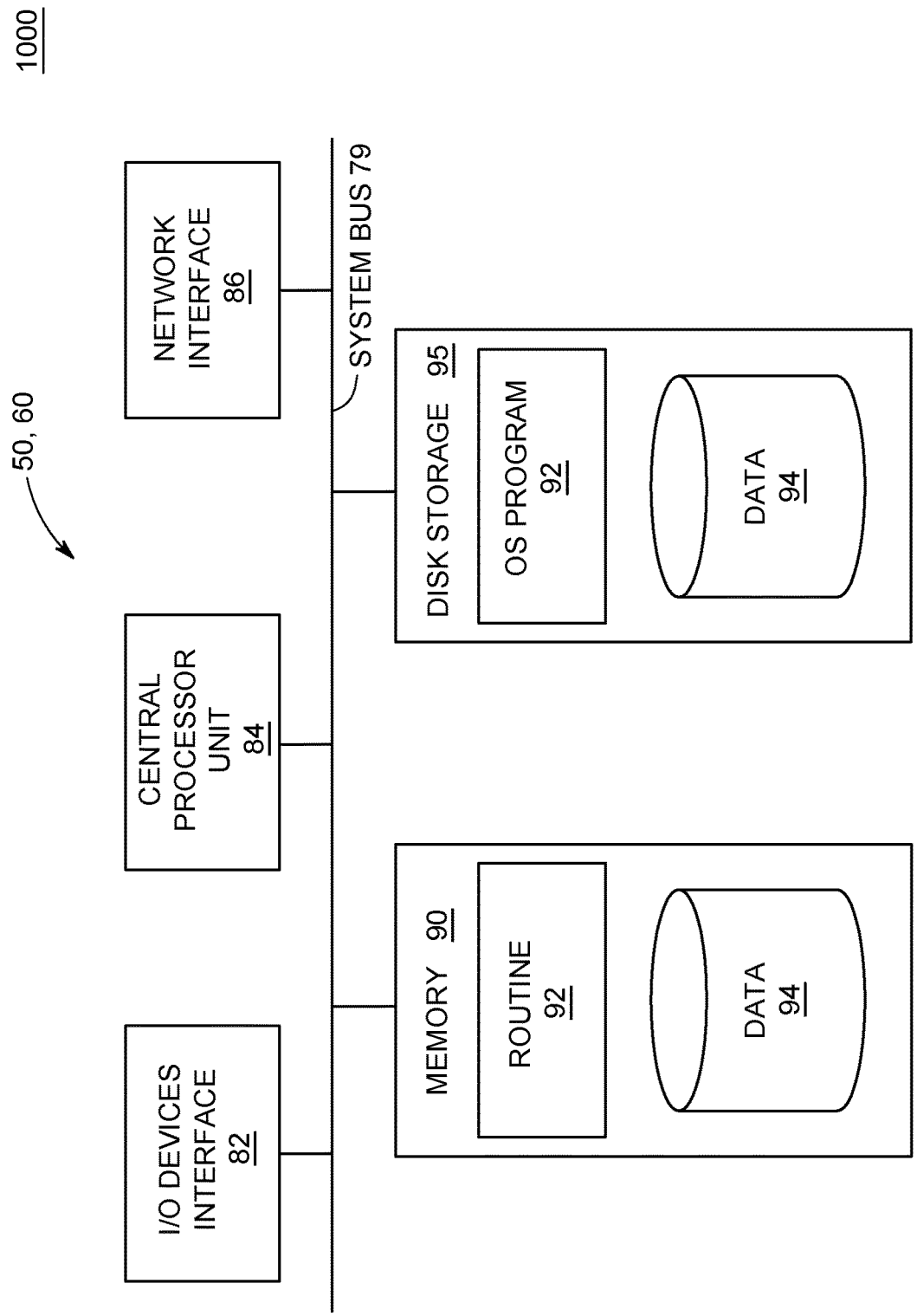
FIG. 7 is a block diagram of an example internal structure of a computer processing device (e.g., client processor/device or server computers) in the computer network system of FIG. 6, according to some embodiments.

According to some embodiments, FIG. 7 is a diagram of an example internal structure of a computer (e.g., client processor/device 50 or server computers 60) in the computer system of FIG. 6. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 6). Memory 90 provides volatile storage for computer software instructions 92 and data 94 used to implement some embodiments 1000 (e.g., multiuser site, computing module, and/or display module engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Embodiments 1000 or aspects thereof may be implemented in the form of hardware (including but not limited to hardware circuitry), firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers including but not limited to both single-tenant and multi-tenant systems, and/or some combination thereof, and, thus, the data processors described herein are intended for purposes of illustration only and not as a limitation of the embodiments.

Some embodiments may provide one or more technical advantages that may transform the behavior and/or data, provide functional improvements, and/or solve a technical problem.

Some embodiments may provide a technical advantage by improving computer security (including but not limited to user data protection) of a device using value based information flow tracking.

Compared to existing approaches, some embodiments may provide a technical advantage by improving the detection accuracy significantly, and reporting fewer false positives. And in comparison to existing approaches, some embodiments may also provide a technical advantage by reporting better accuracy in terms of the number of true positives while being able to handle numerical values.

In addition, some embodiments may provide a technical advantage by using value based information to improve computational efficiency (and/or speed, and/or accuracy) of flow tracking, as compared with existing shadowing techniques. Such improvements may be due to the novel lightweight information flow analysis algorithm for numerical values of some embodiments that do not require exhaustive instruction instrumentation.

Some embodiments may provide functional improvements by improving computer security (including but not limited to user data protection) of a device using value based information flow tracking.

Compared to existing approaches, some embodiments may provide functional improvements by improving the detection accuracy significantly, and reporting fewer false positives. And in comparison to existing approaches, some embodiments may also provide functional improvements by reporting better accuracy in terms of the number of true positives while being able to handle numerical values.

Some embodiments may provide functional improvements to the quality of computer security (including but not limited to user data protection) by using value based information to improve computational efficiency (and/or speed, and/or accuracy) of flow tracking, as compared with existing shadowing techniques. Such improvements may be due to the novel lightweight information flow analysis algorithm for numerical values of some embodiments that do not require exhaustive instruction instrumentation.

Some embodiments may solve a technical problem by improving computer security (including but not limited to user data protection) of a device using value based information flow tracking.

Compared to existing approaches, some embodiments may solve a technical problem by improving the detection accuracy significantly, and reporting fewer false positives. And in comparison to existing approaches, some embodiments may also solve a technical problem by reporting better accuracy in terms of the number of true positives while being able to handle numerical values.

Some embodiments may solve a technical problem by improving the quality of computer security by using value based information to improve computational efficiency (and/or speed, and/or accuracy) of flow tracking, as compared with existing shadowing techniques. Such a solution may be due to the novel lightweight information flow analysis algorithm for numerical values of some embodiments that do not require exhaustive instruction instrumentation.

Further, some embodiments may transform the behavior and/or data of received (or generated or accessed) data flow based upon value based information flow tracking.

METRON is a tradename or trademark of Applicants.

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A computer-implemented method of improving the computer security of a device, the device housing one or more sensors and a digital processor, the method comprising:
   automatically capturing one or more sensor readings from one of the sensors of the device;
   storing in cache memory data values of the captured one or more sensor readings, the cache memory storing the data values in a collection of sensitive data;
   evaluating a data flow from the one sensor to a numerical operation being performed by the digital processor, said evaluating the data flow determining whether numerical values involved in performance of the numerical operation are included in the collection of sensitive data, wherein the numerical operation has a numerical computation; and
   based upon outcome of the determining, preventing one or more data values of the collection of sensitive data from being transmitted from a sink of the device, wherein the preventing is further based on recency of the numerical values involved in performance of the numerical operation being included in the collection of sensitive data.

2. The computer-implemented method of claim 1, wherein:
   the numerical operation includes arithmetic operations, and the numerical values involved include operands and return values of the arithmetic operations;
   the evaluating determines whether one or more representations of the operands and return values of the arithmetic operations are included in the collection of sensitive data by directly comparing the one or more representations to the data values of the collection of sensitive data; and
   the preventing is further based upon outcome of the determining of the one or more representations.

3. The computer-implemented method of claim 1, wherein the storing is performed in response to one or more security policies.

4. The computer-implemented method of claim 1, wherein the determining is performed while the data flow is being accessed and processed.

5. The computer-implemented method of claim 1, wherein the sink includes any of a network socket, a file, or a message.

6. The computer-implemented method of claim 1, wherein at least one of:
   the device is a mobile device, an embedded controller, a desktop computer, a laptop computer, or a computer processing device; and
   the cache memory is configured as any of a ring buffer, a value table, and an array.

7. The computer-implemented method of claim 1, further comprising:
   reporting a violation based upon the determining; and
   in response to the reported violation, performing the preventing of one or more values of the collection of sensitive data from being transmitted from the sink of the device.

8. The computer-implemented method of claim 1, wherein the one or more sensors generate numerical values, and the one sensor is any of: an accelerometer, a gyroscope, an ambient light sensor, a microphone, a global positioning system (GPS), and a heart rate sensor.

9. The computer-implemented method of claim 1, wherein the one sensor generates sensitive data and/or generates data values from which an inference of interest can be calculated.

10. A computer system, comprising:
    a digital processor;
    a cache memory;
    a data module executable by the digital processor and automatically capturing one or more sensor readings from a sensor housed in a device;
    the data module storing in the cache memory data values of the captured one or more sensor readings, the cache memory holding the data values in a collection of sensitive data; and
    a computing module executable by the digital processor, and evaluating a data flow from the sensor to a numerical operation being performed by a processor of the device, the evaluating determining whether numerical values involved in performance of the numerical operation are included in the collection of sensitive data, wherein the numerical operation has a numerical computation; and
    based upon outcome of the determining, the computing module preventing one or more data values of the collection of sensitive data from being transmitted from a sink of the device, wherein the preventing is further based on recency of the numerical values involved in performance of the numerical operation being included in the collection of sensitive data.

11. The computer system of claim 10, wherein:
    the numerical operation includes arithmetic operations, and the numerical values involved include operands and return values of the arithmetic operations; and
    the computing module further determines whether one or more representations of the operands and return values of the arithmetic operations are included in the collection of sensitive data by directly comparing the one or more representations to the data values of the collection of sensitive data, and the preventing by the computing module is further based upon outcome of the determining of the one or more representations.

12. The computer system of claim 10, wherein the data module stores the data values in the cache memory in response to one or more security policies.

13. The computer system of claim 10, wherein the computing module is executed while the data flow is being accessed and processed by processors of the device.

14. The computer system of claim 10, wherein the sink includes any of a network socket, a file, or a message.

15. The computer system of claim 10, wherein at least one of:
the device is a mobile device, an embedded controller, a desktop computer, a laptop computer, or a computer processing device; and
the cache memory is configured as any of a ring buffer, a value table, and an array.

16. The computer system of claim 10, wherein the computing module further generates and outputs a report reporting a violation based upon the determining.

17. The computer system of claim 10, wherein the sensor generates numerical values and includes any of: an accelerometer, a gyroscope, an ambient light sensor, a microphone, a global positioning system (GPS), and a heart rate sensor.

18. The computer system of claim 10, wherein the sensor generates sensitive data and/or generates data values from which an inference of interest can be calculated.

19. A computer program product comprising:
a non-transitory computer-readable storage medium having code instructions stored thereon such that, when executed by a digital processor, the code instructions cause the digital processor to:
automatically capture one or more sensor readings from a sensor housed in a device;
store in cache memory data values of the captured one or more sensor readings in a collection of sensitive data;
evaluate a data flow from the sensor to a numerical operation being performed by a processor of the device, the evaluating determining whether numerical values involved in performance of the numerical operation are included in the collection of sensitive data, wherein the numerical operation has a numerical computation; and
based upon outcome of the determining, prevent one or more data values of the collection of sensitive data from being transmitted from a sink of the device, wherein the preventing is further based on recency of the numerical values involved in performance of the numerical operation being included in the collection of sensitive data.

20. The computer program product of claim 19, wherein:
the numerical operation includes arithmetic operations, and the numerical values involved include operands and return values of the arithmetic operations; and
the digital processor further determines whether one or more representations of the operands and return values of the arithmetic operations are included in the collection of sensitive data by directly comparing the one or more representations to the data values of the collection of sensitive data, and the preventing by the digital processor is further based upon outcome of the determining of the one or more representations.

* * * * *